US011737466B2

(12) United States Patent
Liu et al.

(10) Patent No.: US 11,737,466 B2
(45) Date of Patent: Aug. 29, 2023

(54) METHOD OF IMPROVING THE ABILITY OF PLANTS TO RESISTANCE DISEASES

(71) Applicants: National Taiwan University, Taipei (TW); ACADEMIA SINICA, Taipei (TW)

(72) Inventors: Chi-Te Liu, Taipei (TW); Wen-Chin Yang, Taipei (TW); Yen-Yu Liu, Taipei (TW); Chu-Ning Huang, Taipei (TW); Chan-Pin Lin, Taipei (TW)

(73) Assignees: NATIONAL TAIWAN UNIVERSITY, Taipei (TW); ACADEMIA SINICA, Taipei (TW)

( * ) Notice: Subject to any disclaimer, the term of this patent is extended or adjusted under 35 U.S.C. 154(b) by 147 days.

(21) Appl. No.: 16/708,653

(22) Filed: Dec. 10, 2019

(65) Prior Publication Data

US 2020/0390105 A1  Dec. 17, 2020

(30) Foreign Application Priority Data

Jun. 17, 2019 (TW) ................................ 108120927

(51) Int. Cl.
*A01N 63/22* (2020.01)
*A01N 65/12* (2009.01)

(52) U.S. Cl.
CPC ............. *A01N 63/22* (2020.01); *A01N 65/12* (2013.01)

(58) Field of Classification Search
CPC ................................. A01N 63/22; A01N 65/12
See application file for complete search history.

(56) References Cited

U.S. PATENT DOCUMENTS

2014/0030228 A1\*  1/2014  Blotsky .................. A61K 45/06
424/93.4

OTHER PUBLICATIONS

Adedapo et al. (Comparison of the Nutritive Value and Biological Activities of the Acetone, Methanol and Water Extracts of the Leaves of Bidens Pilosa and Chenopodium Album, Acta Poloniae Pharmaceutica, vol. 68, No. 1 pp. 83-92, 2011) (Year: 2011).\*
Mkindi et al. (Invasive weeds with pesticidal properties as potential new crops, Industrial Crops & Products, 110 (2017) p. 113-122 (Year: 2017).\*
Farah Deba et al., Herbicidal and fungicidal activities and identification of potential phytotoxins from *Bidens pilosa* L. var. *radiata* Scherff, Weed Biology and Management, vol. 7, Issue 2, pp. 77-83, published May 3, 2007 (Year: 2007).\*

\* cited by examiner

*Primary Examiner* — Johann R Richter
*Assistant Examiner* — Danielle Sullivan
(74) *Attorney, Agent, or Firm* — WPAT, P.C

(57) ABSTRACT

The present invention provides a method of improving the ability of plants to resistance diseases, comprising using a strain of *Bacillus amyloliquefaciens* and a *Bidens* plant extract; and the *Bidens* plant extract enhances the ability of the *Bacillus amyloliquefaciens* to inhibit the growth of the *Acidovorax avenae* subsp. *citrulli*, increases the metabolic activity of the *Bacillus amyloliquefaciens*, increases the amount of the biofilm formation of the *Bacillus amyloliquefaciens*, and maintains the alive number of the *Bacillus amyloliquefaciens*.

16 Claims, 9 Drawing Sheets

E

F

METHOD OF IMPROVING THE ABILITY OF PLANTS TO RESISTANCE DISEASES

CROSS-REFERENCE TO RELATED APPLICATION

This application claims priority of Taiwan application No. 108120927, filed Jun. 17, 2019 the content of which is incorporated herein in its entirety by reference.

BACKGROUND OF THE INVENTION

1. Field of the Invention

The present invention provides a method of improving the ability of plants to resistance diseases, and more particularly to the method comprising using a strain of *Bacillus amyloliquefaciens* and a *Bidens* plant extract; wherein, the *Bidens* plant extract enhances the ability of the *Bacillus amyloliquefaciens* to inhibit the growth of the *Acidovorax avenae* subsp. *citrulli*, increases the metabolic activity of the *Bacillus amyloliquefaciens*, increases the amount of the biofilm formation of the *Bacillus amyloliquefaciens*, and maintains the alive number of the *Bacillus amyloliquefaciens*

2. The Prior Art

Global climate change has a great impact on agriculture, which seriously affects the quality and quantity of agricultural products. The high temperature and the humid climate in Taiwan become a breeding ground for pathogenic microorganisms, which make field crops suffer from various degrees of damage, resulting in the loss of production. Conventional agriculture uses chemical pesticides to control diseases. However, long-term application of the same pesticides may cause an increase in field selection pressure and make harmful microorganisms susceptible to drug resistance. In addition, the pesticides will cause the seed germination rate to decrease, and toxic substances will accumulate on the plants. Excessive use of chemical pesticides also creates an environmental burden and triggers a more serious ecological crisis.

As consumers begin to focus on food safety issues and the rise of organic agriculture, more and more scientists are betting on the development of biological plant protection preparations; wherein, recently, the agricultural management concept of reconciling agricultural production with the ecological environment has gradually been valued and advocated. "Sustainable agriculture" has clearly listed as an important goal of agricultural governance, and the use of chemical fertilizers and pesticides has also reduced year by year.

Kloepper et al. proposed the concept of "plant growth promoting rhizobacteria" (PGPR), which promotes the inoculation of beneficial microorganisms into the rhizosphere soil or on plants to improve the physicochemical properties of soil, promote crop growth, reduce diseases, and thus increasing the quality and quantity of productions. Since most studies have proved that the use of PGPR can achieve high yield and natural ecological balance in crop cultivation, many countries have also invested in research and development of such agricultural microbial resources. The concepts of biofertilizer and biopesticide are also derived and many related products have been practically applied in agricultural production. In addition to promoting plant growth, many studies have shown that when microorganisms encounter adverse conditions including dryness, salt damage, and extreme temperature, specific microorganisms can help plants effectively alleviate the impact of abiotic stress factors on plant growth physiology.

Taiwanese climate is very easy to induce bacterial diseases in plants due to high temperature and humidity. For example, the bacterial wilt in Solanaceae plants such as tobacco, green pepper, eggplant, pepper and the bacterial fruit blotch of cucurbits in melon plants such as watermelon, melon, pumpkin and bitter gourd cause serious economic losses every year. The former pathogen is *Ralstonia solanacearum*, and the latter is *Acidovorax avenae* subsp. *Citrulli*.

The bacterial fruit blotch of cucurbits mainly occurs in the rainy season, and can infect the leaves, stems and fruits of melons. After infections, the typical symptoms are irregular large-scale olive-water-immersed plaques on the surface, which greatly affects commodities value. The main primary source of infection for the bacterial fruit blotch of cucurbits is the melon seeds with bacteria. In addition, the spread of the pathogens can also be caused by sprinkler irrigation systems and rain splashes in the melon seedlings and fields. For now, the common prevention and treatment method is to apply copper, antibiotics, or bleach to eliminate the pathogens on the seeds. Taking watermelon as an example, the average cost of spraying and control of each land per year is about 1,000 NTD, which is estimated to cost about 120 million NTD per year in Taiwan. However, as mentioned earlier, the application of the agents tends to injure the seed, resulting in a decrease in the germination rate. In addition, regardless of any of the above seed treatment methods, it is impossible to prevent infection of seedlings or adult plants by foreign pathogens. Therefore, seed disinfection is not generally adopted by seed farmers and farmers.

For now, the types of control agents for bacterial diseases are scarce, and the problem of drug resistance of pathogenic strains is also prone to occur. Therefore, recently, many studies have reported the use of PGPR as a means of controlling the above two types of bacterial diseases, especially the use of the *Bacillus subtilis* and the *Bacillus amyloliquefaciens* have fairly good control effects, can effectively reduce the incidence of diseases, delay the progress of the diseases. However, since the microbial preparation mainly utilizes the function of the living bacteria, so whether the candidate microorganisms maintain a high viable amount during the production process, storage, and applied to the field becomes a standard for the microbial preparation.

The candidate microorganisms can obtain a large number of cells after fermentation, but to be a commercially valuable microbial preparation, it is necessary to pass a formulation process to ensure that the microorganisms maintain high viable amount during production, and storage to provide protection against other abiotic or biological damage after application to the field. Although there have been quite a lot of reports on PGPR in the literature over the past few decades, microbial preparations that are truly mature in the market are only a small part, which is largely due to the lack of suitable dosage form processing. As a result, the number of viable bacteria during the storage period is greatly degraded, or the application to the field is limited by the influence of environmental factors, and the function would not be performed. Therefore, how to maintain the high cell viability of the candidate microorganisms by protecting and supplementing the materials with appropriate formulation has become the focus of commercialization of the candidate microorganisms.

SUMMARY OF THE INVENTION

To solve the foregoing problem, one objective of the present invention is to provide method of improving the ability of plants to resistance diseases, comprising using a *Bacillus amyloliquefaciens* and a *Bidens* plant extract.

Another objective of the present invention is to provide a method of increasing the ability of a *Bacillus amyloliquefaciens* to improve plants to resistance diseases, comprising administering an effective amount of a *Bidens* plant extract to a plant in need.

The other objective of the present invention is to provide a composition of improving the ability of plants to resistance diseases, comprising a *Bacillus amyloliquefaciens* and a *Bidens* plant extract.

In one embodiment of the present invention, the *Bidens* plant extract maintains the number of viable bacteria of the *Bacillus amyloliquefaciens* in the composition.

In one embodiment of the present invention, the concentration of the *Bidens* plant extract in the composition is 300 ppm-200,000 ppm.

In one embodiment of the present invention, the concentration of the *Bacillus amyloliquefaciens* in the composition is at least $0.8 \times 10^8$ CFU/mL.

In one embodiment of the present invention, the *Bidens* plant extract is a *Bidens pilosa* extract, and the *Bidens pilosa* extract is a *Bidens pilosa* water extract.

In one embodiment of the present invention, the *Bacillus amyloliquefaciens* is DSM 33327.

In one embodiment of the present invention, the *Bidens* plant extract enhances the ability of the *Bacillus amyloliquefaciens* to inhibit the growth of *Acidovorax avenae* subsp. *citrulli*.

In one embodiment of the present invention, the *Bidens* plant extract increases the metabolic activity of the cells of the *Bacillus amyloliquefaciens*, increases the amount of the biofilm synthesis of the *Bacillus amyloliquefaciens*, or maintains the number of viable bacteria of the *Bacillus amyloliquefaciens*.

The *Bacillus amyloliquefaciens* of the present invention can effectively inhibit the growth of the *Acidovorax avenae* subsp. *Citrulli* (Aac), and has the potential to slow down the bacterial fruit blotch of cucurbits; however, the effects of inhibiting the growth of Aac is not observed in the supernatant of the culture medium of the *Bacillus amyloliquefaciens* of the present invention, indicating that only the live *Bacillus amyloliquefaciens* has the activity of inhibiting Aac. Therefore, when the *Bacillus amyloliquefaciens* of the present invention is used for preparing a biological preparation, it is necessary to ensure that the microorganism maintains a high viable amount during the production process or storage, so that the biological preparation can maintain the efficacy of inhibiting the pathogenic bacteria after being applied to the field. Wherein, the *Bidens pilosa* extract has a variety of biological activities, and is easy to obtain and plant, therefore the *Bidens pilosa* extract is tested to whether containing the potential of being used as leveling agents for the biological preparation.

After an in vitro test, when the concentration of the *Bidens pilosa* extract of the present invention is between 300-200,000 ppm, the growth of the *Bacillus amyloliquefaciens* of the present invention is not affected; in addition, the *Bidens pilosa* extract of the present invention is found to effectively improve the effect of the *Bacillus amyloliquefaciens* of the present invention on inhibiting the growth of Aac, and can simultaneously promote the amount of the biofilm synthesis without affecting the normal growth of the *Bacillus amyloliquefaciens* of the present invention, indicating that the *Bidens pilosa* extract of the present invention has the potential of being used as leveling agents for the biological preparation. In addition, the *Bidens pilosa* extract of the present invention can effectively enhance the cell viability of the *Bacillus amyloliquefaciens* of the present invention, and the appropriate dose of the *Bidens pilosa* extract of the present invention can indeed be used as a nutrient source for the growth of the *Bacillus amyloliquefaciens* of the present invention in a nutrient-deficient environment. The results indicate that the *Bidens pilosa* extract of the present invention can be used as leveling agents for the biological preparation and be combined with the *Bacillus amyloliquefaciens* of the present invention to be prepared as the biological preparation capable of inhibiting the growth of Aac, improving the ability of plants to resist diseases, assisting crops in alleviating abiotic stresses, or promoting plant growth.

After the in vivo test in plants, the *Bacillus amyloliquefaciens,* the *Bidens pilosa* extract, or the biological preparation of the present invention would not affect the activity of seed germination, even in the case of a relatively high concentration of the *Bidens pilosa* extract of the present invention (containing more than 25,000 ppm); and the biological preparation of the present invention containing 300 ppm to 600 ppm of the *Bidens pilosa* extract of the present invention has similar efficacy in controlling the bacterial fruit blotch of cucurbits with KASUGAMYCIN+COPPER OXYCHLORIDE (Ksm+oxc), which is commonly used to inhibit Aac commercially, and its control efficacy is better than that of the group using *Bacillus amyloliquefaciens* of the present invention alone. The biological preparation containing 300 ppm to 600 ppm of the *Bidens pilosa* extract of the present invention can effectively improve the biocontrol efficacy, the disease incidence, and the disease index so that the biological preparation of the present invention can indeed effectively inhibit the bacterial fruit blotch of cucurbits. In addition, the *Bacillus amyloliquefaciens* of the present invention can effectively reduce the amount of Aac in the infected plants, and the biological preparation containing 300 ppm to 600 ppm of the *Bidens pilosa* extract of the present invention can reduce the more amount of Aac in the infected plants, indicating that the biological preparation can indeed be effectively applied to slow down the occurrence of the bacterial fruit blotch of cucurbits in plants.

Therefore, the biological preparation comprising leveling agents of the *Bidens pilosa* extract of the present invention and the *Bacillus amyloliquefaciens* of the present invention indeed has the abilities to inhibit the growth of Aac, improve the ability of plants to resist diseases, assist crops in alleviating abiotic stresses, or promote plant growth; wherein the *Bidens pilosa* extract of the present invention can still increase the metabolic activity of the *Bacillus amyloliquefaciens,* increase the amount of the biofilm formation of the *Bacillus amyloliquefaciens,* and maintains the alive number of the *Bacillus amyloliquefaciens* during the production process or storage. Therefore, the biological preparation of the present invention can maintain the efficacy of inhibiting the pathogenic bacteria after being applied to the field, and the *Bidens pilosa* is an edible food, not a synthetic chemical, so the biological preparation of the present invention can also be applied to the organic farming.

The embodiments of the present invention are further described with the following drawings. The following embodiments are given to illustrate the present invention and are not intended to limit the scope of the present invention, and those having ordinary skill in the art can make some modifications and refinements without departing from the spirit and scope of the present invention. Therefore, the scope of the present invention is defined by the scope of the appended claims.

DETAILED DESCRIPTION OF THE PREFERRED EMBODIMENT

Definition

The data provided in the present invention represent approximated, experimental values that may vary within a range of ±20%, preferably ±10%, and most preferably ±5%.

Statistical analysis is performed using Excel software. Data are expressed as mean±standard deviation (SD), and the differences between these are analyzed by Tukey's test, or Student's t-test for statistically significant differences (P<0.05).

The "*Bidens pilosa* extract or BP" describes herein is the leaves of the *Bidens pilosa* are mixed with water at a certain solid-liquid ratio after air-dried and extracted by a specific time and temperature.

The "probiotic or probiotic bacteria" describes herein is a microorganism, the cells thereof, the mixed strains, the extracts or the secondary metabolites with a positive effect on the host itself, and are usually derived from living bacteria in the individual and beneficial to the health of the individual. Probiotic or probiotic bacteria can also refer to certain microorganisms that are externally supplemented and are beneficial to the individual, wherein the metabolite of the probiotic strain is a secretion of the probiotic strain, and comprises a culture medium for culturing the bacteria.

According to the present invention, the operating procedures and parameter conditions for bacterial culture are within the professional literacy and routine techniques of those having ordinary skill in the art.

The "abiotic stress" describes herein can be , but be not limited to, abiotic environmental factors such as drought, high salt, high temperature, low temperature, flooding, phosphorus deficiency, and heavy metal contamination.

The "biological preparation" describes herein is a composition comprising a specific ratio of a *Bacillus amyloliquefaciens* and a *Bidens pilosa* extract.

The present invention provides a synergistic plant protection biological preparation comprising the *Bacillus amyloliquefaciens* of the present invention and the *Bidens pilosa* extract of the present invention. The biological preparation can effectively inhibit the growth of the Aac to improve the ability of plants to resistance diseases, and promote the growth of plants; wherein, the *Bidens pilosa* extract of the present invention can still increase the metabolic activity of the *Bacillus amyloliquefaciens,* increase the amount of the biofilm formation of the *Bacillus amyloliquefaciens,* and maintains the alive number of the *Bacillus amyloliquefaciens* during the production process or storage.

Meanwhile, the synergistic plant protection biological preparation of the present invention can further comprise an agriculturally acceptable organic material such as, but not limited to, a photosynthetic fertilizer, narrow range oil, or a sterile polypropylene.

The test of the effect of the *Bacillus amyloliquefaciens* of the present invention on inhibiting the growth of Aac, the test that whether of the effect of the *Bacillus amyloliquefaciens* of the present invention on inhibiting the growth of Aac is from the *Bacillus amyloliquefaciens* or the secondary metabolites thereof, the detailed extraction method of the *Bidens pilosa* extract of the present invention, the test of the *Bidens pilosa* extract would not affect the growth of the *Bacillus amyloliquefaciens* of the present invention, the test of the effect of the different concentration of the *Bidens pilosa* extract on the growth of the *Bacillus amyloliquefaciens* of the present invention, the test of the effect of the *Bidens pilosa* extract on increasing the ability of the *Bacillus amyloliquefaciens* of the present invention for inhibiting the growth of Aac, the test of the effect of the *Bidens pilosa* extract on increasing the amount of the biofilm formation of the *Bacillus amyloliquefaciens* of the present invention, the test of the effect of the *Bidens pilosa* extract on increasing the metabolic activity of the *Bacillus amyloliquefaciens* of the present invention, the test of the effect of the biological preparation of the present invention containing different concentration of the *Bidens pilosa* extract on inhibiting the bacterial fruit blotch of cucurbits in plants, and the test of the effect of the biological preparation of the present invention on reducing the amount of Aac in infected plants will all be described in detail below to confirm that the synergistic plant protection biological preparation of the present invention can effectively inhibit the growth of the Aac to improve the ability of plants to resistance diseases, and promote the growth of plants, and to confirm that the *Bidens pilosa* extract of the present invention can still increase the metabolic activity of the *Bacillus amyloliquefaciens,* increase the amount of the biofilm formation of the *Bacillus amyloliquefaciens,* and maintains the alive number of the *Bacillus amyloliquefaciens.*

The *Bacillus amyloliquefaciens* of the Present Invention

The *Bacillus amyloliquefaciens* used in the examples of the present invention is the *Bacillus amyloliquefaciens* strain WF02, which is a kind of probiotic bacteria. The *Bacillus amyloliquefaciens* strain WF02 is registered in the Food Industry Research and Development Institute (Taiwan) on Dec. 17, 2015, with the number BCRC80929 and it also is deposited in Deutsche Sammlung von Mikroorganismen and Zellkulturen (DSMZ; Inhoffenstr. 7B, D-38124 Braunschweig, Germany) on Nov. 14, 2019, with the number DSM 33327. The *Bacillus amyloliquefaciens* strain WF02 will be publicly available and all restrictions imposed on the availability to the public of the deposited material will he irrevocably removed upon the granting of the present application. The *Bacillus amyloliquefaciens* is a Gram-positive bacterium, which is an aerobic bacterium with a peripheral flagellum and strong activity. The long-term preservation of the bacterium can be preserved by freeze drying or cryopreservation, and in the latter method, 1 mL of the bacterial liquid is placed in a freezing tube, and a final concentration of about 15% glycerol is added as a cryoprotectant, and the frozen tube is placed in a −80° C. for storage. Apart of the frozen mass is directly taken out from the frozen tube, and inoculated to a fresh medium and cultured at 37° C. for activation. In the examples of the present invention, it is confirmed by the in vitro test that the *Bacillus amyloliquefaciens* of the present invention can effectively inhibit the growth of Aac and has the potential of slow down the bacterial fruit blotch of cucurbits in plants; in addition, it is confirmed by the in vivo test in plants that *Bacillus amyloliquefaciens* of the present invention would not affect the activity of seed germination and can indeed effectively control the bacterial fruit blotch of cucurbits in plants, reduce the amount of Aac in the infected plants, improve the biocontrol efficacy, the disease incidence, and the disease index.

The Resource and Culture of the *Bacillus*

The *Bacillus amyloliquefaciens* strain WF02 used in the examples of the present invention was isolated by the inventor of the present invention in the Wufeng Mountain area, and the number is DSM 33327; the *Bacillus subtilis* strain Y1336 used in the examples of the present invention is commercially available for use in the biological control product BIOBAC® WP (purchased from BION TECH INC., Taiwan), which has the effect of inhibiting bacterial wilt of Solanaceae, and inhibiting the growth of fungal pathogens such as *Fusarium oxysporum* and *Phytophthora palmivora;* The *Bacillus amyloliquefaciens* strain BPD1 used in the examples of the present invention was provided by Dr. Hsieh, Feng-Chia (Taiwan Agricultural Chemicals and Toxic Substances Research Institute, Council of Agriculture, Executive Yuan), and has the effect of inhibiting the growth of fungal pathogens such as *Rhizoctonia solani* and *Botrytis elliptica.* In order to prepare the inoculants of the three *Bacillus* strains, a single colony was separately selected and cultured in 3 mL of LB (Luria-Bertani) culture medium at 37° C. and 200 rpm for 24 hours. After 24 hours, 10 μL of the cultured solution were taken out in a fresh LB medium for subculture at 37° C. and 200 rpm for 24 hours. After 24 hours, 0.1 mL of the cultured solution was taken out in a 250 mL Erlenmeyer flask containing 50 mL of fresh LB medium and shaken at 37° C. and 200 rpm for 8 hours. Wherein, the *Bacillus subtilis* strain Y1336 and the *Bacillus amyloliquefaciens* strain BPD1 are strains of the control group.

The Resource and Culture of the *Acidovorax avenae* subsp. *Citrulli*

The *Acidovorax avenae* subsp. *citrulli* (Aac) used in the examples of the present invention was isolated from cucurbits, and is provided by KNOWN-YOU SEED CO., LTD. In order to prepare the inoculants of the Aac, a single colony was selected and cultured in 3 mL of LB (Luria-Bertani) culture medium at 37° C. and 200 rpm for 24 hours. After 24 hours, 10 μL of the cultured solution were taken out in a fresh LB medium for subculture at 37° C. and 200 rpm for 24 hours. After 24 hours, 0.1 mL of the cultured solution was taken out in a 250 mL Erlenmeyer flask containing 50 mL of fresh LB medium and shaken at 37° C. and 200 rpm for 8 hours.

EXAMPLE 1

Effect of the *Bacillus amyloliquefaciens* on Inhibiting the Growth of Aac

In the embodiment of the present invention, in order to test the effect of the *Bacillus amyloliquefaciens* WF02 on inhibiting the growth of Aac, an in vitro antagonistic assay was used (i.e. an inhibition zone method), wherein the inhibition zone method is also known as the diffusion method, which uses the analyze to diffuse in the agarose gel to inhibit the growth of bacteria around it to form a transparent circle, that is, an inhibition zone, and to determine the antibacterial property of the analyze according to the size of the inhibition zone. The inhibition zone method commonly used in the separation and screening of antibiotic-producing bacteria.

First, the Aac was cultured in the above method and 100 μL of a bacterial solution with an $OD_{600}$ value of 0.3, which approximately contains $10^8$ CFU/mL, was uniformly applied to an agarose plate (diameter 9 cm) and a plurality of circular sterile filter papers (diameter 8 mm) was placed thereon. The analyzes of the *Bacillus amyloliquefaciens* strain WF02, the *Bacillus subtilis* strain Y1336, and the Bacillus amyloliquefaciens strain BPD1 were cultured in the above method and 20 μL of each bacterial solution with an $OD_{600}$ value of 1.0, which approximately contains $10^8$ CFU/mL, was directly dropped onto the sterile filter papers; in addition, 81.3% of KASUGAMYCIN+COPPER OXYCHLORIDE (1000× Ksm+oxc), which is a biocide commercially used to inhibit Aac, was diluted at a ratio of 1:1000, and was also dropped onto the sterile filter papers; in addition as a positive control group; and a group of LB medium was used as a negative control group. Next, the culture plate was incubated at 37° C. for 48 hours, and the diameter of the inhibition zone was measured as an ability to evaluate the inhibition of Aac in each group; wherein each group was subjected to 3 repetitions, and the average value of each group is the mean±standard deviation of 3 repetitions, and the average value of each group and the statistically significant were determined by Tukey's test (P<0.05).

Figure 1:
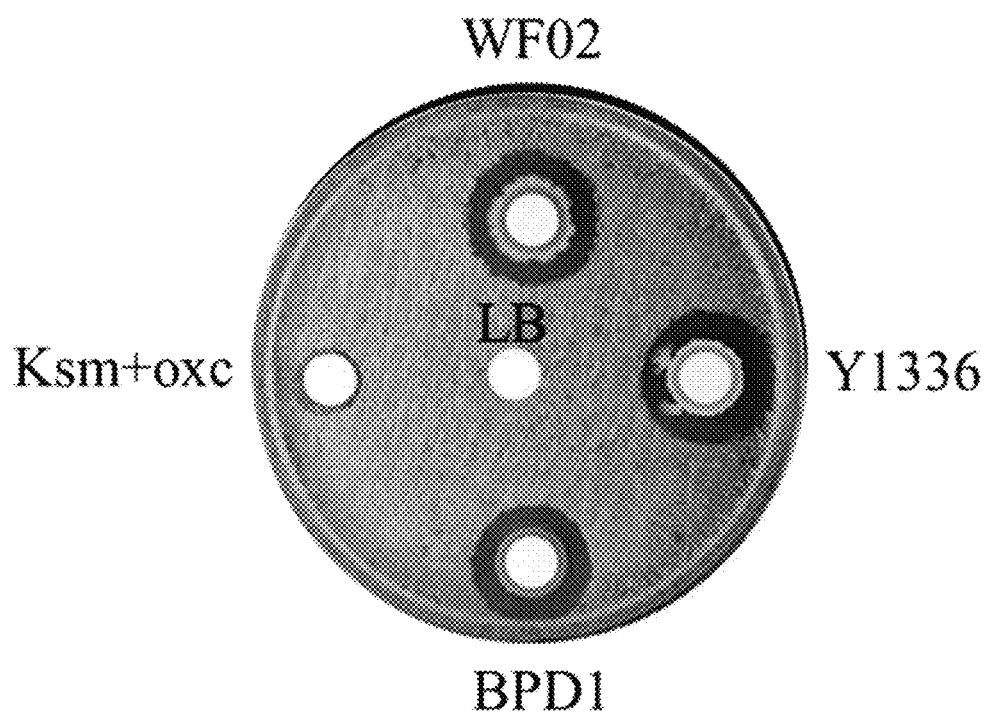
FIG. 1 shows a picture that the *Bacillus amyloliquefaciens* inhibits the growth of Aac in one embodiment of the present invention.

The results of the effect of the *Bacillus amyloliquefaciens* WF02 on inhibiting the growth of Aac are shown in FIG. 1; and the quantified results of the diameter of the inhibition zone are shown in Table 1; wherein the values represented are the average of 3 replicates±Standard deviation (SD). As showing in FIG. 1, after treated with the positive control group of Ksm+oxc, an inhibition zone could be formed on the culture plate of Aac., and after treated with the negative control group of LB culture, no inhibition zone was formed, indicating that the method is indeed can be used to test the efficacy of inhibiting Aac growth. After treated with the *Bacillus subtilis* strain Y1336, an inhibition zone with a diameter of about 22.85 mm was formed; after treated with the *Bacillus amyloliquefaciens* strain BPD1, an inhibition zone with a diameter of about 19.77 mm was formed; and after treated with the *Bacillus amyloliquefaciens* strain WF02 of the present invention, an inhibition zone with a diameter of about 21.28 mm was formed; wherein, Table 1 was a result of statistical analysis that whether there was a significant difference between each group. If the same English letter were marked, there would be no statistical difference between them; wherein a, b, and c in table 1 were used to indicate statistically different groups, i.e. a, b, and c are statistically significant difference. The results show that the *Bacillus amyloliquefaciens* strain WF02 of the present invention can significantly inhibit the growth of Aac, and has the potential of slowing down the bacterial fruit blotch of cucurbits in plants.

TABLE 1

The diameter of inhibition zone of WF02, Y1336, and BPD1 on the plate

| | Diameter of Inhibition Zone (mm) |
|---|---|
| WF02 | 21.28 ± 0.07 [b] |
| Y1336 | 22.85 ± 0.84 [a] |
| BPD1 | 19.77 ± 0.20 [c] |

EXAMPLE 2

Effect of the Live *Bacillus amyloliquefaciens* on Inhibiting the Growth of Aac

In the embodiment of the present invention, in order to test that whether of the effect of the *Bacillus amyloliquefaciens* WF02 of the present invention on inhibiting the growth of Aac is from the *Bacillus amyloliquefaciens* WF02 or the secondary metabolites thereof, the *Bacillus amyloliquefaciens* WF02 of the present invention was cultured in the above method and the supernatant of the culture medium of the *Bacillus amyloliquefaciens* WF02 after 8, 24, and 48 hours culturing were collected and were carried out with an in vitro antagonistic test in the same way. The Aac was cultured in the above method and 100 μL of a bacterial solution with an $OD_{600}$ value of 0.3, which approximately contains $10^8$ CFU/mL, was uniformly applied to an agarose plate (diameter 9 cm) and a plurality of circular sterile filter papers (diameter 8 mm) was placed thereon. The 20 μL of each collected supernatant was directly dropped onto the sterile filter papers; in addition, a group of LB medium was used as a negative control group. Next, the culture plate was incubated at 37° C. for 48 hours, and the diameter of the inhibition zone was measured as an ability to evaluate the inhibition of Aac in each group.

Figure 2:
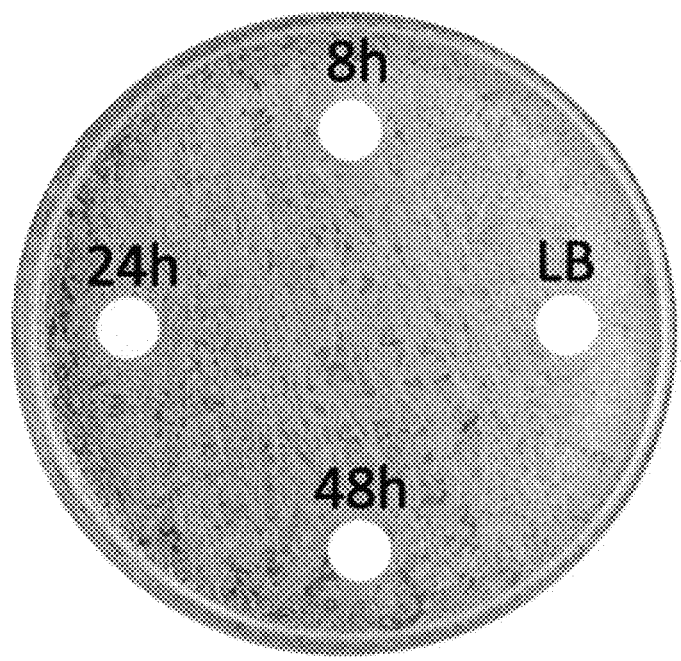
FIG. 2 shows a picture that the supernatant of the culture medium of the *Bacillus amyloliquefaciens* cannot inhibit the growth of Aac in one embodiment of the present invention.

The results of the supernatant of the culture medium of the *Bacillus amyloliquefaciens* WF02 of the present invention cannot inhibit the growth of Aac are shown in FIG. 2. As showing in FIG. 2, after treated with the supernatant of the culture medium after 8, 24, and 48 hours culturing, there were not any inhibition zone on the plate, indicating that the supernatant of the culture medium of the *Bacillus amyloliquefaciens* WF02 of the present invention could not inhibit the growth of Aac, and only the live bacteria of the *Bacillus amyloliquefaciens* WF02 has the activity of inhibiting the growth of Aac. Therefore, when the *Bacillus amyloliquefaciens* WF02 of the present invention is used for preparing a biological preparation, it is necessary to ensure that the microorganism maintains a high viable amount during the production process or storage, so that the biological preparation can maintain the efficacy of inhibiting the pathogenic bacteria after being applied to the field. Thus, it is necessary to find leveling agents capable of maintaining the growth and physiological activity of the *Bacillus amyloliquefaciens* WF02 of the present invention.

EXAMPLE 3

Preparation of the *Bidens* Plant Extract

In the embodiment of the present invention, the leaves of a *Bidens* plant was washed and then air-dried and grinded at room temperature. The dried and grinded leaves of the *Bidens* plant was extracted using water in a weight ratio of the solvent to leaves of the *Bidens* plant in 16-24:0.8-1.2, wherein the preferable weight ratio is 1:20. After vigorous shaking extraction at 24-36° C. for 24-36 minutes; wherein the preferable temperature is 30° C., and the preferable extraction time is 30 minutes. The crude extract was filtered through a filter paper with a pore diameter of 8.8-1.32 μm to obtain a filtrate, wherein the preferable diameter of the filter paper is 11 μm. The obtained filtrate is the *Bidens* plant extract of the present invention; wherein the preferable *Bidens* plant is *Bidens pilosa*.

*Bidens pilosa* var. *radiate* (*Bidens pilosa*) is a perennial herb plant of the genus *Biposits* of Compositae. *Bidens pilosa* is a traditional medicinal and edible plant, and it can also be used as a feed additive for the control of livestock and poultry protozoal infections. Recently, the secondary metabolites of *Bidens pilosa* have been found to have anti-inflammatory, immunomodulatory, and anti-hyperglycemic effects in humans Since the extract of *Bidens pilosa* has a variety of biological activities, and the *Bidens pilosa* is easy to obtain and plant therefore it would be test that whether the extract of *Bidens pilosa* contains the potential of being used as leveling agents for the biological preparation.

EXAMPLE 4

Effect of the *Bidens pilosa* Extract on the Growth of the *Bacillus amyloliquefaciens*

To be used as leveling agents for the biological preparation, in the embodiment of the present invention, it is necessary to confirm that the *Bidens pilosa* extract of the present invention without the effect of inhibiting the growth of the *Bacillus amyloliquefaciens* WF02 of the present invention, so antagonistic assay was used; wherein ampicillin is known with the effect on inhibiting the growth of the *Bacillus amyloliquefaciens*, therefore, it was used as a positive control group. First, the *Bacillus amyloliquefacien* WF02 of the present invention was cultured in the above method and 100 μL of a bacterial solution with an $OD_{600}$ value of 0.3, which approximately contains $10^8$ CFU/mL, was uniformly applied to two agarose plates (diameter 9 cm) and a plurality of circular sterile filter papers (diameter 8 mm) was placed thereon; wherein one plate was for testing the higher concentration (125,000-200,000 ppm) of the *Bidens pilosa* of the present invention, and the other was for the lower concentration (300-2,000 ppm). The 20 μL analyzes of (a) the positive control group with 100,000 ppm ampicillin, (b) the negative control group with the LB medium, (c) the test group with 200,000 ppm the *Bidens pilosa* extract of the present invention, (d) the test group with 100,000 ppm the *Bidens pilosa* extract of the present invention, (e) the test group with 50,000 ppm the *Bidens pilosa* extract of the present invention, (f) the test group with 25,000 ppm the *Bidens pilosa* extract of the present invention, (g) the test group with 12,500 ppm the *Bidens pilosa* extract of the present invention, (h) the test group with 2,000 ppm the *Bidens pilosa* extract of the present invention, (i) the test group with 1,000 ppm the *Bidens pilosa* extract of the present invention, (j) the test group with 600 ppm the *Bidens pilosa* extract of the present invention, and (k) the test group with 300 ppm the *Bidens pilosa* extract of the present invention were directly dropped onto the sterile filter papers respectively. Next, the culture plates were incubated at 37° C. for 48 hours, and the diameter of the inhibition zone was measured as an ability to evaluate the inhibition of the *Bacillus amyloliquefaciens* of the present invention in each group; wherein each group was subjected to 3 repetitions, and the average value of each group is the mean±standard deviation of 3 repetitions, and the average value of each group and the statistically significant were determined by Tukey's test (P<0.05).

Figure 3A:
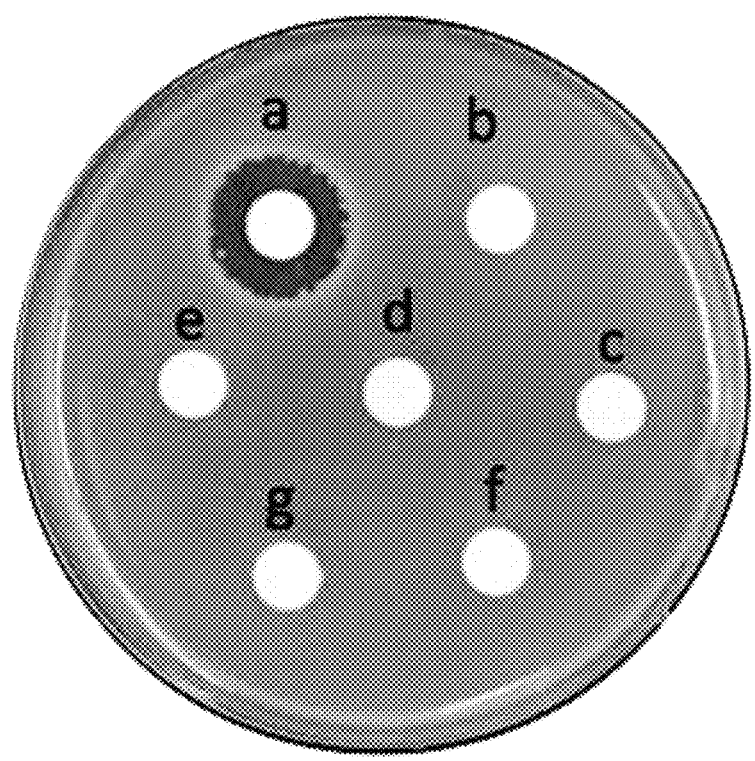
FIG. 3A shows a picture the *Bidens pilosa* extract would not inhibit the growth of the *Bacillus amyloliquefaciens* in one embodiment of the present invention.
Figure 3B:
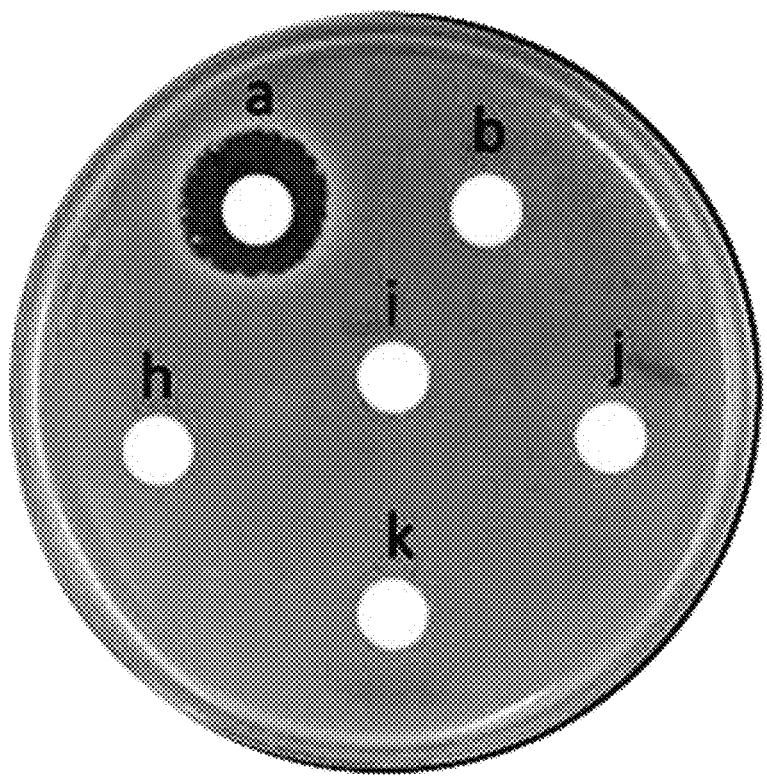
FIG. 3B shows a picture the *Bidens pilosa* extract would not inhibit the growth of the *Bacillus amyloliquefaciens* in one embodiment of the present invention.

The results of the *Bidens pilosa* extract of the present invention without the effect of inhibiting the growth of the *Bacillus amyloliquefaciens* WF02 of the present invention are shown in FIG. 3A and FIG. 3B. As showing in FIG. 3A and FIG. 3B, after treated with the positive group with ampicillin, an obvious inhibition zone with a diameter of about 18.4 mm was formed; however, after treated with the negative group with the LB medium, there was not any inhibition zone on the plate, indicating that the method could indeed be used to test the efficacy of inhibiting the growth of the *Bacillus amyloliquefaciens* WF02 of the present invention. Nonmatter after treated with the high concentration (12,500-200,000 ppm) or the low concentration (300-2,000 ppm) of the *Bidens pilosa* extract of the present invention, there were not any inhibition zone on the plate. The results indicate that the *Bidens pilosa* extract of the present invention without the effect of inhibiting the growth of the *Bacillus amyloliquefaciens* of the present invention.

EXAMPLE 5

Effect of the *Bidens pilosa* Extract on Enhancing the Efficacy of the *Bacillus amyloliquefaciens* against Aac In the embodiment of the present invention, in order to test the effect of the *Bidens pilosa* extract on enhancing the efficacy of the *Bacillus amyloliquefaciens* against Aac, antagonistic assay was used; wherein in the embodiment, the Aac isolated from melon, watermelon, squash, and tobacco (i.e. Aac31) was tested. First, four kinds of the Aac was cultured in the above method respectively and 100 μL of each bacterial solution with an $OD_{600}$ value of 0.3, which approximately contains $10^8$ CFU/mL, was uniformly applied to an agarose plate (diameter 9 cm) and a plurality of circular sterile filter papers (diameter 8 mm) was placed thereon. The 20 μL analyzes of (1) the comparison group with the *Bacillus amyloliquefaciens* WF02 of the present invention alone, (2) the test group with the *Bacillus amyloliquefaciens* WF02 of the present invention plus 300-200,000 ppm the *Bidens pilosa* extract of the present invention, (3) the negative control group with the LB medium (data not show), and (4) the positive control group with 1000× Ksm+oxc diluted at 1:1000 ratio (data not show) were directly dropped onto the sterile filter papers respectively, wherein the *Bacillus amyloliquefacien* WF02 of the present invention was cultured in the above method and 100 μL of a bacterial solution with an $OD_{600}$ value of 1.0, which approximately contains $10^8$ CFU/mL. Next, the culture plate was incubated at 37° C. for 48 hours, and the diameter of the inhibition zone was measured as an ability to evaluate the inhibition of Aac in each group; wherein the efficacy against Aac was calculated by the following formula: (the diameter of the inhibition zone−the diameter of dropped solution)/the diameter of dropped solution×100%.

Figure 4:
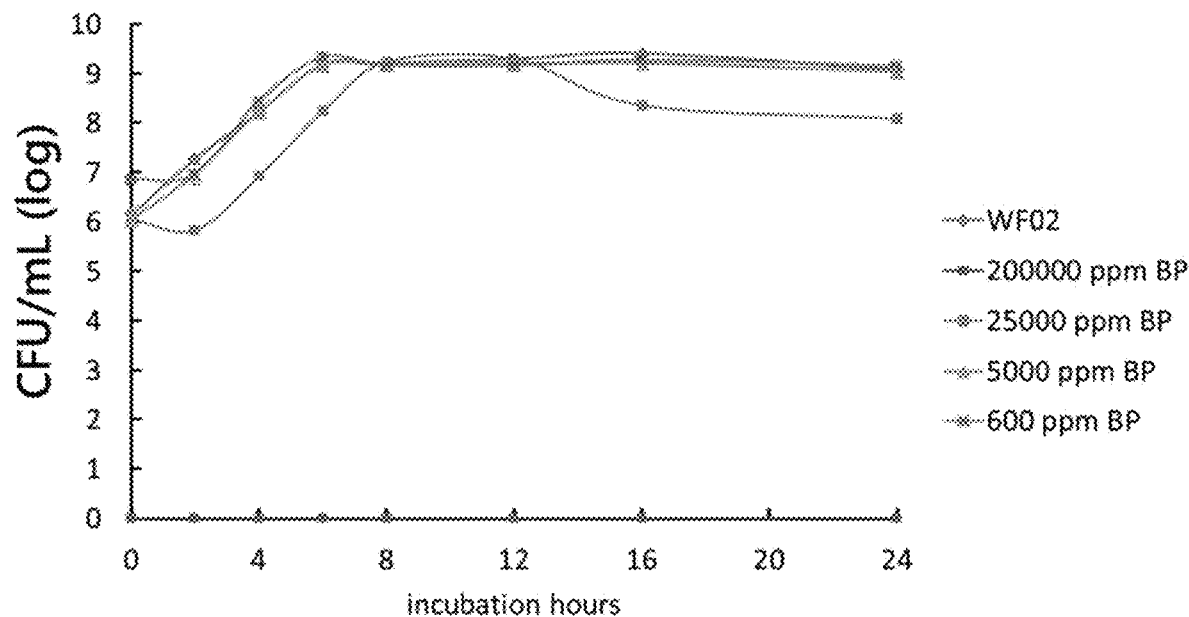
FIG. 4 shows that the *Bidens pilosa* extract enhances the efficacy of the *Bacillus amyloliquefaciens* against Aac in one embodiment of the present invention. *p<0.05; *** p<0.001.

The results of the effect of the *Bidens pilosa* extract on enhancing the efficacy of the *Bacillus amyloliquefaciens* against Aac are shown in FIG. 4. As showing in FIG. 4, after treated with the positive group with 1000× Ksm+oxc diluted at 1:1000 ratio, an obvious inhibition zone was formed on each of these four plates with four different kinds of Aac strains (data not shown); however, after treated with the negative group with the LB medium, there was not any inhibition zone on the plates (data not shown), indicating that the method could indeed be used to test the efficacy of inhibiting the growth of Aac. On the plates with Aac strains isolated from melon, watermelon, squash, and tobacco, after treated with the comparison group of the *Bacillus amyloliquefaciens* WF02 of the present invention alone, the growth of Aac could be inhibited only about 40%; however, after treated with the *Bacillus amyloliquefaciens* WF02 of the present invention plus the *Bidens pilosa* extract of the present invention, the growth of Aac could be inhibited about 48%, 50%, 45%, and 55% respectively. The results indicate that the *Bidens pilosa* extract of the present invention can indeed enhance the efficacy of the *Bacillus amyloliquefaciens* of the present invention against the growth of Aac, and the *Bidens pilosa* extract of the present invention may have potential as leveling agents for the biological preparation.

EXAMPLE 6

Effect of the *Bidens pilosa* Extract on Enhancing the Biofilm Formation of the *Bacillus amyloliquefaciens*

Biofilm is a highly structured microbial community attached to a solid surface, and the internal microorganisms are surrounded by an extracellular matrix produced by themselves, which is composed of proteins, polysaccharides, and extracellular DNA. Many studies have shown that the formation of biofilm in plant probiotic colonization plays an important role on the plant surface, and the presence of biofilm can enhance the efficacy of the probiotic biocontrol. Therefore, in the embodiment of the present invention was to test the effect of the *Bidens pilosa* extract of the present invention on enhancing the biofilm formation of the *Bacillus amyloliquefaciens* WF02 of the present invention. First, a single colony of the *Bacillus amyloliquefaciens* WF02 of the present invention was inoculated into a test tube containing 3 mL of LB medium, and after shaking at 200 rpm for 16-18 hours at 37° C., the 3 mL of the bacterial solution was inoculated into a 250 mL flask containing 50 mL of fresh LB medium for shaking at 37° C. for 8 hours until the bacterial solution with an $OD_{600}$ value of 1.0 or more, which approximately contains $10^8$ CFU/mL, and 10 μL of the bacterial solution was taken out and added to the following 5 plastic tubes containing 3 mL of LB medium and cultured in the dark at 37° C. for 2 days respectively: (1) a control group without the *Bidens pilosa* extract of the present invention, (2) the test group with 2,000 ppm of the *Bidens pilosa* extract of the present invention, (3) the test group with 1,000 ppm of the *Bidens pilosa* extract of the present invention, (4) the test group with 600 ppm of the *Bidens pilosa* extract of the present invention, and (5) the test group with 300 ppm of the *Bidens pilosa* extract of the present invention. Next, the LB medium in each plastic tube was slowly emptied, and rinsed with sterile distilled deionized water (DDW) to remove the incomplete biofilm, and 3.5 mL of 0.1% crystal violet solution was added for staining the biofilm on the surface of the plastic tubes. After the biofilm was stained for 15 minutes, the crystal violet solution was removed and washed three times with DDW, and then 3.5 mL of absolute ethanol was added to each tube, and sonicated for 20 minutes to make the dye release from the biofilm. Finally, the $OD_{570}$ was measured using an Ultraspec 2100 pro UV/visible spectrophotometer (Amersham Biosciences); and the *Bacillus amyloliquefaciens* in each tube was calculated by the method described in Example 4; wherein each group was subjected to 3 repetitions, and the average value of each group and the statistically significant were determined by Tukey's test (P<0.05).

Figure 5A:
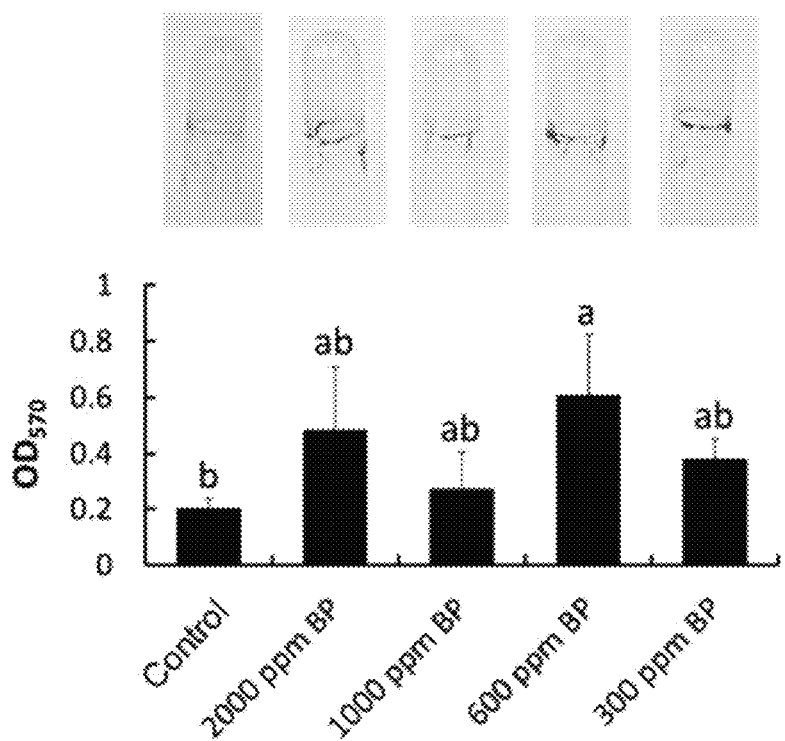
FIG. 5A shows and a picture that the *Bidens pilosa* extract (BP) enhances the biofilm formation of the *Bacillus amyloliquefaciens* in one embodiment of the present invention.
Figure 5B:
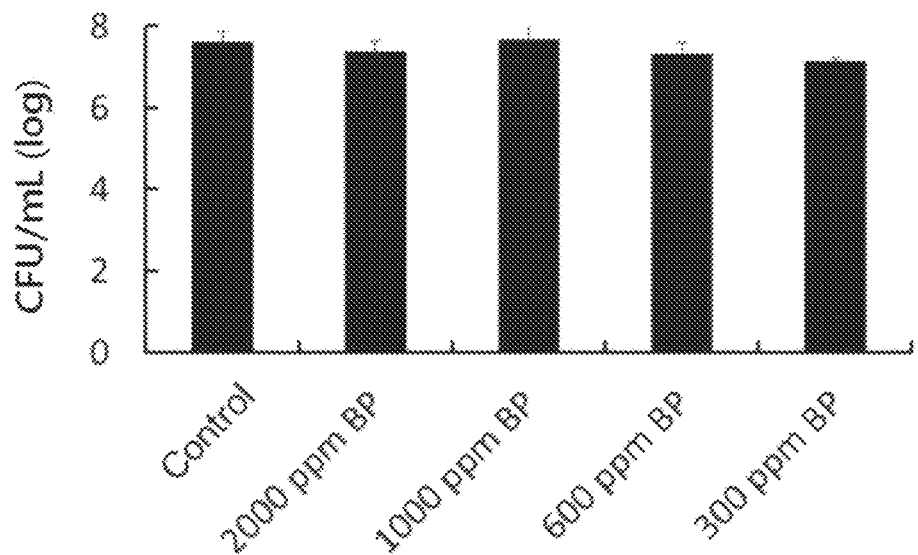
FIG. 5B shows that the *Bidens pilosa* extract (BP) affects the cell number of the *Bacillus amyloliquefaciens* in one embodiment of the present invention.

The results of the effect of the *Bidens pilosa* extract of the present invention on enhancing the biofilm formation of the *Bacillus amyloliquefacien* WF02 of the present invention are shown in FIG. 5A; the effect of the *Bidens pilosa* extract of the present invention on the cell number of the *Bacillus amyloliquefacien* WF02 of the present invention are shown in FIG. 5B. As showing in FIG. 5A and FIG. 5B, adding 300 ppm-2,000 ppm the *Bidens pilosa* extract of the present invention into the bacterial culture medium could effectively increase the biofilm formation of the *Bacillus amyloliquefacien* WF02 of the present invention, and after treated with different concentration of the *Bidens pilosa* extract of the present invention, there was no significant difference in the cell number of *Bacillus amyloliquefacien* WF02 of the present invention. The results indicate that the *Bidens pilosa* extract of the present invention can promote the biofilm formation without affecting the normal growth of the of the *Bacillus amyloliquefacien* of the present invention, and therefore the *Bidens pilosa* extract of the present invention could be used as leveling agents for the biological preparation.

EXAMPLE 7

Effect of the *Bidens pilosa* Extract on Enhancing the Cell Viability of the *Bacillus amyloliquefaciens* and as a Nutrient Source for the Growth of the *Bacillus amyloliquefaciens*

In the embodiment of the present invention, in order to test effect of the *Bidens pilosa* extract on enhancing the cell viability of the *Bacillus amyloliquefaciens* and as a nutrient source for the growth of the *Bacillus amyloliquefaciens*, the resazurin-based assay was used; wherein, resazurin is a blue dye that will become a purple-purple resorufin after reduction, and will become a colorless and transparent hydroresorufin when reduced to a completely anaerobic state. There are enzymes that can reduce resazurin in viable cells, so when the color of the dye becomes lighter, the higher cell viability is; therefore, the resazurin can be used to test the activity of cell viability.

First, the *Bacillus amyloliquefaciens* WF02 of the present invention was inoculated into a 250 mL beaker containing 50 mL of LB culture medium, and cultured in the dark at 37° C. and 200 rpm for 8 hours until the bacterial solution with an $OD_{600}$ value of 1.0, which approximately contains $10^8$ CFU/mL. The 7.5 μL of the bacterial solution was added to each well of a 96-well plate containing 135 μL of the reagent, wherein the reagent was L2 broth lacking synthetic nitrogen (i.e. nutrient deficiency). The L2 broth contains 0.2 mg/mL biotin, 0.4 mg/mL of nicotinic acid, and 0.4 mg/mL pantothenic acid as a substrate, and additionally adds carbon and nitrogen source, and 7.6 mM ammonium sulfate and 0.01% (w/v) resazurin dye (purchased from Sigma-Aldrich, St. Louis, Mo., USA). Next, 15 μL the *Bidens pilosa* extract of the present invention was diluted with $ddH_2O$ to the following concentrations: (1) 2,000 ppm, (2) 1,000 ppm, (3) 600 ppm, (4) 300 ppm, (5) 200 ppm, (6) 100 ppm, and (7) 50 ppm, and then were added into each well of the well plate as a nutritional supplement; wherein the group without *Bidens pilosa* extract was as the negative control. After reacting at 37° C. for 15 hours in the dark, the reduction of resazurin was observed to confirm the cell viability of the *Bacillus amyloliquefaciens* WF02 of the present invention, and the cell number of the *Bacillus amyloliquefaciens* WF02 in each well was calculated by the method described in Example 4; wherein each group was subjected to 3 repetitions, and the average value of each group is the mean±standard deviation of 3 repetitions, and the statistically significant of the mean values between each group was determined by Tukey's test (P<0.05), and the statistically significant between the 15 hours and 0 hours after reaction of each group was determined by Student's t test (P<0.01; *P<0.001).

Figure 6A:
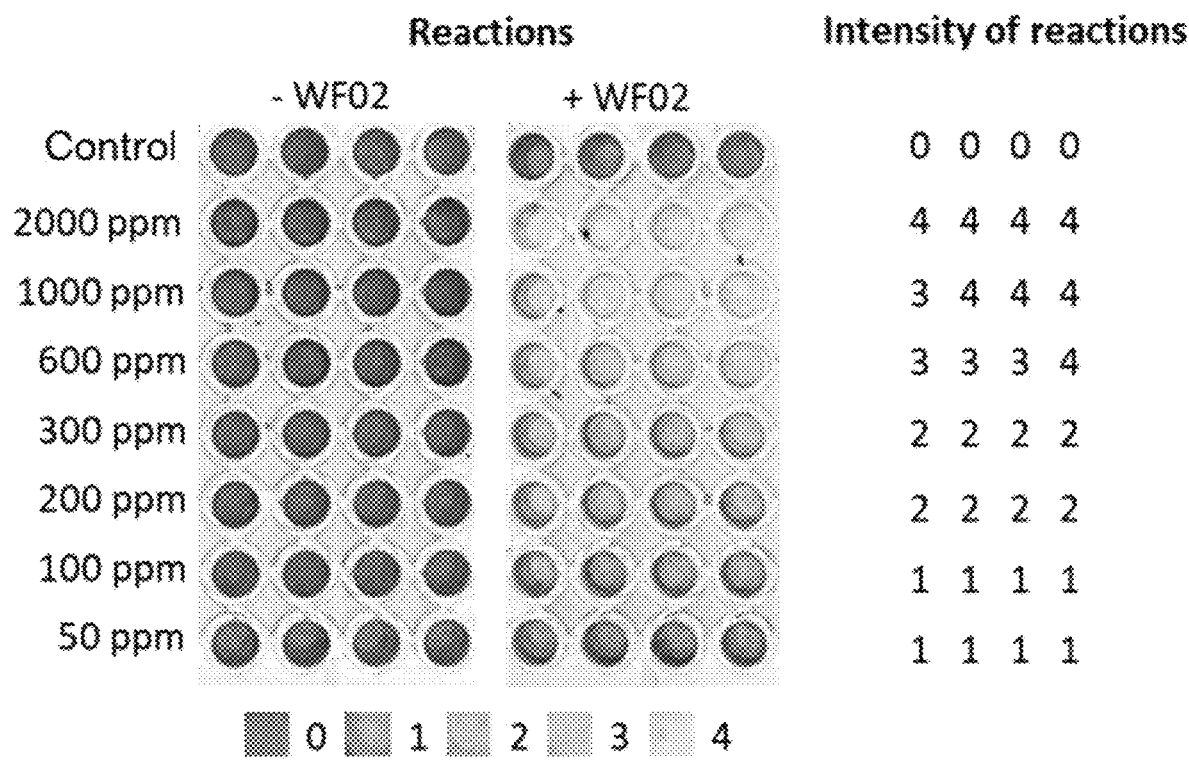
FIG. 6A shows that the *Bidens pilosa* extract (BP) enhances the metabolic activity of the *Bacillus amyloliquefaciens* in one embodiment of the present invention.

The results of the effect of the *Bidens pilosa* extract on enhancing the cell viability of the *Bacillus amyloliquefaciens* are shown in FIG. 6A; wherein, in order to quantify the experimental results, the negative reaction is represented by a score of 0 (i.e. the reduction reaction of resazurin did not occur), and the positive reaction of different strengths is represented by the score 1-4. The larger the score is, the more reduction reaction of resazurin happens, which means that the cell viability is higher. Resazurin could be reduced by any concentration of the *Bidens pilosa* extract of the present invention, wherein after treated with a relatively high concentration (600 ppm-2000 ppm) of the *Bidens pilosa* extract of the present invention, the resazurin underwent a strong reduction reaction (score 3-4); and resazurin did not be reduced in the negative control group without the *Bidens pilosa* extract of the present invention. The results indicate that the *Bidens pilosa* extract of the present invention can effectively enhance the cell viability of the *Bacillus amyloliquefaciens* of the present invention.

Figure 6B:
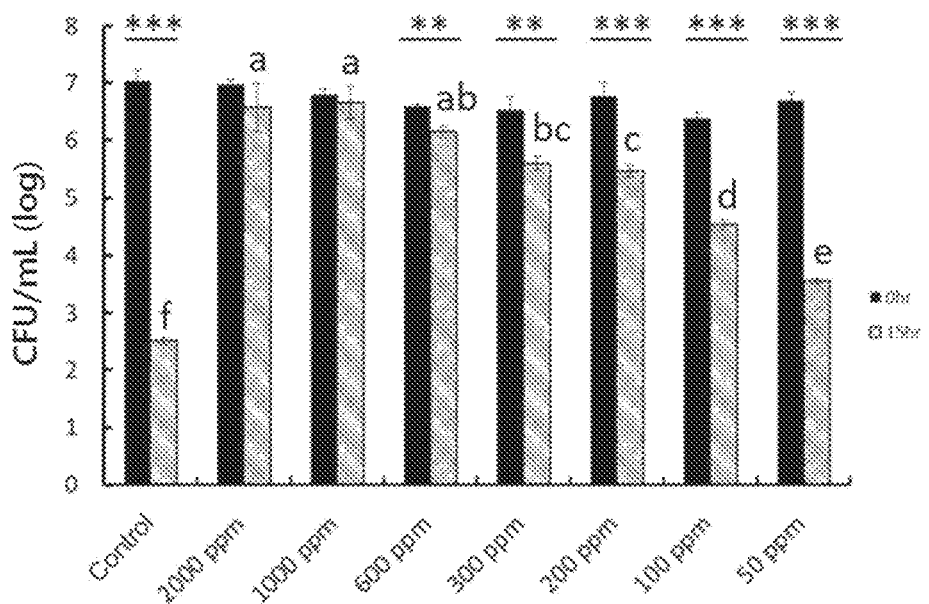
FIG. 6B shows that the *Bidens pilosa* extract (BP) makes as a nutrient source for the growth of the *Bacillus amyloliquefaciens* in one embodiment of the present invention. *p<0.05; p<0.01; *p<0.001.

The results of the effect of the *Bidens pilosa* extract as a nutrient source for the growth of the *Bacillus amyloliquefaciens* are shown in FIG. 6B. After the reaction without the

*Bidens pilosa* extract of the present invention for 15 hours, the cell number of the *Bacillus amyloliquefaciens* WF02 of the present invention significantly reduced from 7.0 log CFU/mL to 2.5 log CFU/mL; however, after the reaction with 600 ppm, 1,000 ppm, and 2,000 ppm of the *Bidens pilosa* extract of the present invention for 15 hours, the cell number of the *Bacillus amyloliquefaciens* WF02 of the present invention could be maintained at about $10^6$ to $10^7$ CFU/mL; and after the reaction with 300 ppm or less of the *Bidens pilosa* extract of the present invention for 15 hours, the cell number of the *Bacillus amyloliquefaciens* WF02 of the present invention would decrease as the concentration decrease. The results indicate that the *Bidens pilosa* extract of the present invention can indeed be used as a nutrient source for the growth of the *Bacillus amyloliquefaciens* of the present invention in a nutrient-deficient environment.

Therefore, in combination with the foregoing results, the *Bidens pilosa* extract of the present invention be used as leveling agents for the biological preparation and be combined with the *Bacillus amyloliquefaciens* of the present invention to be prepared as the biological preparation capable of inhibiting the growth of Aac, improving the ability of plants to resist diseases, assisting crops in alleviating abiotic stresses, or promoting plant growth.

EXAMPLE 8

Figure 7:
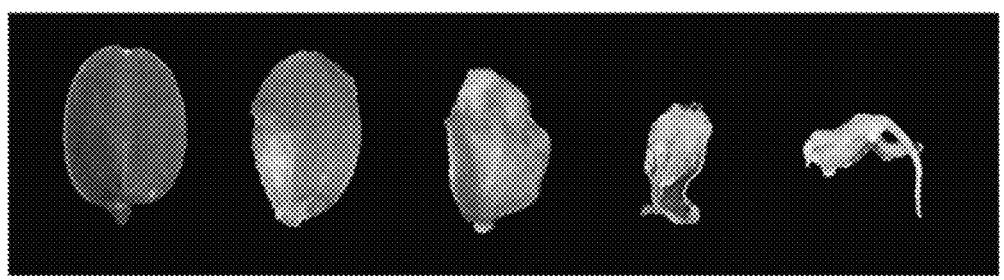
FIG. 7 shows a schematic picture of the grading symptoms of a descriptive scale for assessing the severity of disease in each plant seedling.

Effect of the Biological Preparation on Inhibiting the Bacterial Fruit Blotch of Cucurbits in Plants In the embodiment of the present invention, in order to test the effect of the biological preparation containing different concentration of the *Bidens pilosa* extract of the present invention on inhibiting the bacterial fruit blotch of cucurbits in plants, first, the *Bacillus amyloliquefaciens* WF02 of the present invention and Aac were pre-cultured in the above method at 37° C. for 16-18 hours, respectively; and then Aac was sub-cultured in a 250 mL flask until the bacterial solution with an $OD_{600}$ value of 0.3, which approximately contains $10^8$ CFU/mL; and the *Bacillus amyloliquefaciens* WF02 of the present invention was sub-cultured in a 250 mL flask until the bacterial solution with an $OD_{600}$ value of 1.0, which approximately contains $10^8$ CFU/mL. Next, the surface of melon seeds was sterilized by 1% HCl for 20 minutes, and then air-dried overnight. The seeds were co-incubated with 20 mL of the aforementioned Aac bacterial solution for 20 minutes under the continuous vacuum environment to adhere the pathogen onto the surface of the seeds. After air-dried overnight, the seeds were divided into the following 22 groups (n=50 per group) and incubated under a vacuum environment for 20 minutes: (1) the healthy blank control group added 10 mL of LB medium without Aac treatment, (2) the negative control group only infected with Aac, (3) the comparison group added 10 mL of the *Bacillus amyloliquefaciens* WF02 of the present invention, (4) the comparison group added 10 mL of 300 ppm the *Bidens pilosa* extract of the present invention, (5) the comparison group added 10 mL of 600 ppm the *Bidens pilosa* extract of the present invention, (6) the comparison group added 10 mL of 1,250 ppm the *Bidens pilosa* extract of the present invention, (7) the comparison group added 10 mL of 2,500 ppm the *Bidens pilosa* extract of the present invention, (8) the comparison group added 10 mL of 5,000 ppm the *Bidens pilosa* extract of the present invention, (9) the comparison group added 10 mL of 25,000 ppm the *Bidens pilosa* extract of the present invention, (10) the comparison group added 10 mL of 50,000 ppm the *Bidens pilosa* extract of the present invention, (11) the comparison group added 10 mL of 100,000 ppm the *Bidens pilosa* extract of the present invention, (12) the comparison group added 10 mL of 200,000 ppm the *Bidens pilosa* extract of the present invention, (13) the test group added 10 mL of the biological preparation containing the *Bacillus amyloliquefaciens* WF02 of the present invention and 300 ppm the *Bidens pilosa* extract of the present invention, (14) the test group added 10 mL of the biological preparation containing the *Bacillus amyloliquefaciens* WF02 of the present invention and 600 ppm the *Bidens pilosa* extract of the present invention, (15) the test group added 10 mL of the biological preparation containing the *Bacillus amyloliquefaciens* WF02 of the present invention and 1,250 ppm the *Bidens pilosa* extract of the present invention, (16) the test group added 10 mL of the biological preparation containing the *Bacillus amyloliquefaciens* WF02 of the present invention and 2,500 ppm the *Bidens pilosa* extract of the present invention, (17) the test group added 10 mL of the biological preparation containing the *Bacillus amyloliquefaciens* WF02 of the present invention and 5,000 ppm the *Bidens pilosa* extract of the present invention, (18) the test group added 10 mL of the biological preparation containing the *Bacillus amyloliquefaciens* WF02 of the present invention and 25,000 ppm the *Bidens pilosa* extract of the present invention, (19) the test group added 10 mL of the biological preparation containing the *Bacillus amyloliquefaciens* WF02 of the present invention and 50,000 ppm the *Bidens pilosa* extract of the present invention, (20) the test group added 10 mL of the biological preparation containing the *Bacillus amyloliquefaciens* WF02 of the present invention and 100,000 ppm the *Bidens pilosa* extract of the present invention, (21) the test group added 10 mL of the biological preparation containing the *Bacillus amyloliquefaciens* WF02 of the present invention and 200,000 ppm the *Bidens pilosa* extract of the present invention, (22) the positive control group added 1000× Ksm+oxc diluted at 1:1000 ratio; wherein, the amount of the bacteria was $10^8$ CFU/mL in each group added the *Bacillus amyloliquefaciens* WF02 of the present invention. An example of the method for prepare the biological preparation was as follows: the biological preparation containing the *Bacillus amyloliquefaciens* WF02 of the present invention and 300 ppm the *Bidens pilosa* extract of the present invention was taking 10 mL of the bacterial solution containing about $10^8$ CFU/mL of bacteria plus 60 μL of the *Bidens pilosa* extract; and the biological preparation containing the *Bacillus amyloliquefaciens* WF02 of the present invention and 600 ppm the *Bidens pilosa* extract of the present invention was taking 10 mL of the bacterial solution containing about $10^8$ CFU/mL of bacteria plus 120 μL of the *Bidens pilosa* extract. Next, the above treated seeds were sown in pots and placed in a greenhouse at a temperature of 25-27° C., a relative humidity of about 70-80%, and a sunshine for 16 hours, and then observed the symptoms of the bacterial fruit blotch of cucurbits on the melon seedling leaves (such as necrosis and water-soaking) and the germination rate of seeds after 10 days incubation. The descriptive scale was used for determining the severity of disease in each plant seedling, and the score ranges from 0 to 4, wherein 0=asymptomatic; 1=less than ⅓ of small necrotic lesions on less than ⅓ of the cotyledon, 2=necrotic lesions ⅓ to ⅔ of the cotyledon, 3=large spreading lesions, greater than ⅔ of cotyledon, and 4=dead plant, and the graded symptoms were as shown in FIG. 7. The following formula were used to calculate the disease index, disease incidence (%), and biological control efficacy (%); wherein the average value of each group and the statistically significant were determined by Tukey's test ($P<0.05$).

Disease index=Σ (disease severity×number of corresponding disease severity melon cotyledons)/(the highest disease severity×total number of melon cotyledons)×100% Disease incidence (%)=(number of diseased plants/total number of plants in each treatment)×100%.

Biological control efficacy (%)=[(disease index of control plants−disease index of antagonist treated plants)/disease index of control]×100%

Figure 8A:
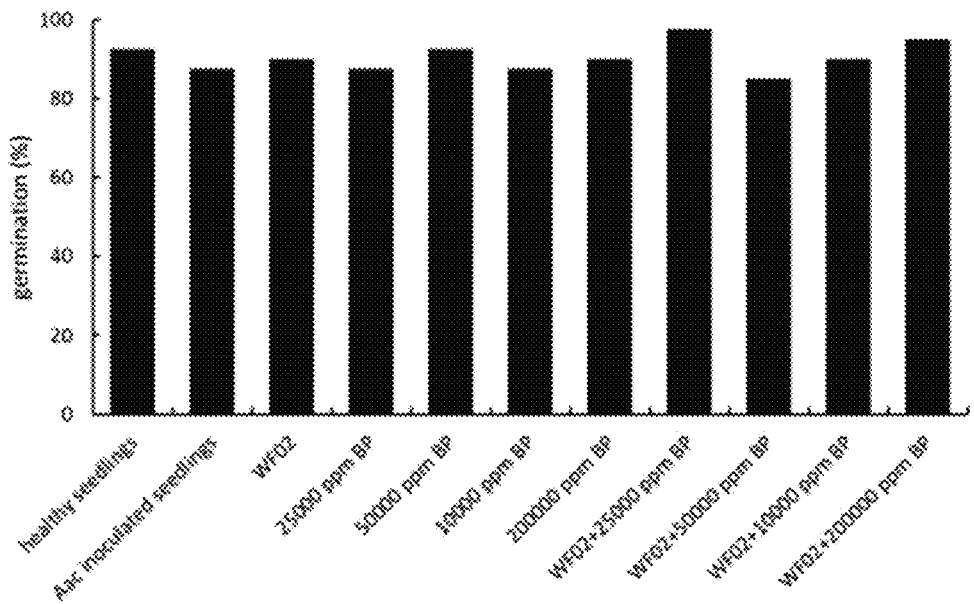
FIG. 8A shows that the biological preparation containing 25,000 ppm-200,000 ppm the *Bidens pilosa* extract (BP) affects the germination rate of melon seeds in one embodiment of the present invention.
Figure 8B:
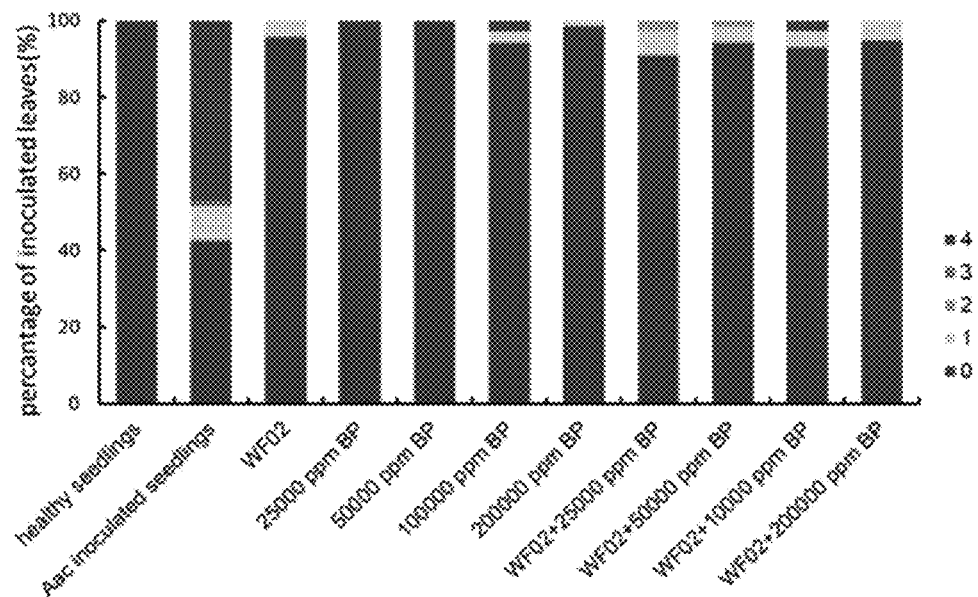
FIG. 8B shows that the biological preparation containing 25,000 ppm-200,000 ppm the *Bidens pilosa* extract (BP) improves the efficacy of inhibiting the bacterial fruit blotch of cucurbits in plants in one embodiment of the present invention.
Figure 8C:
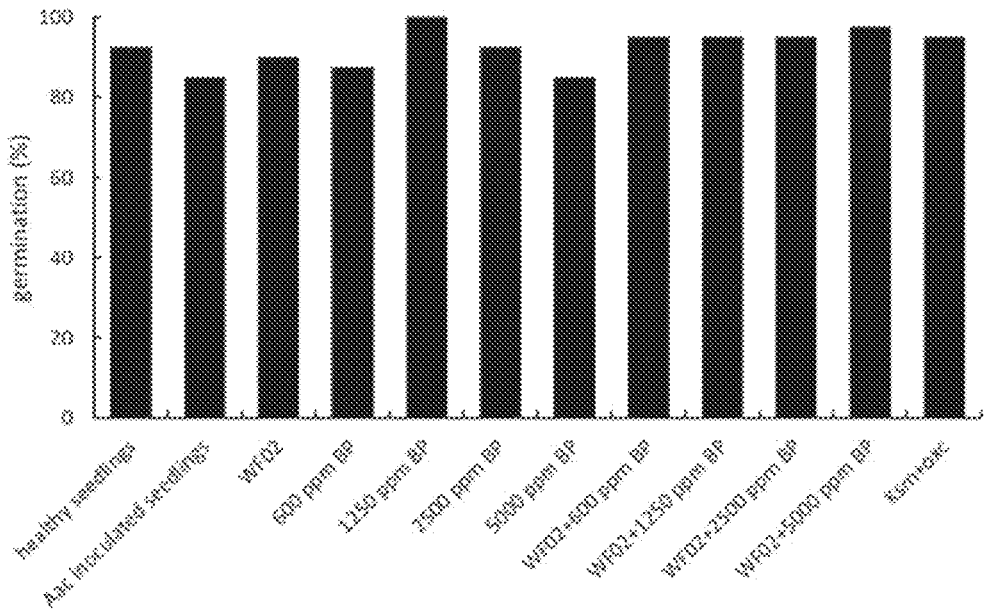
FIG. 8C shows that the biological preparation containing 600 ppm-5,000 ppm the *Bidens pilosa* extract (BP) affects the germination rate of melon seeds in one embodiment of the present invention.
Figure 8D:
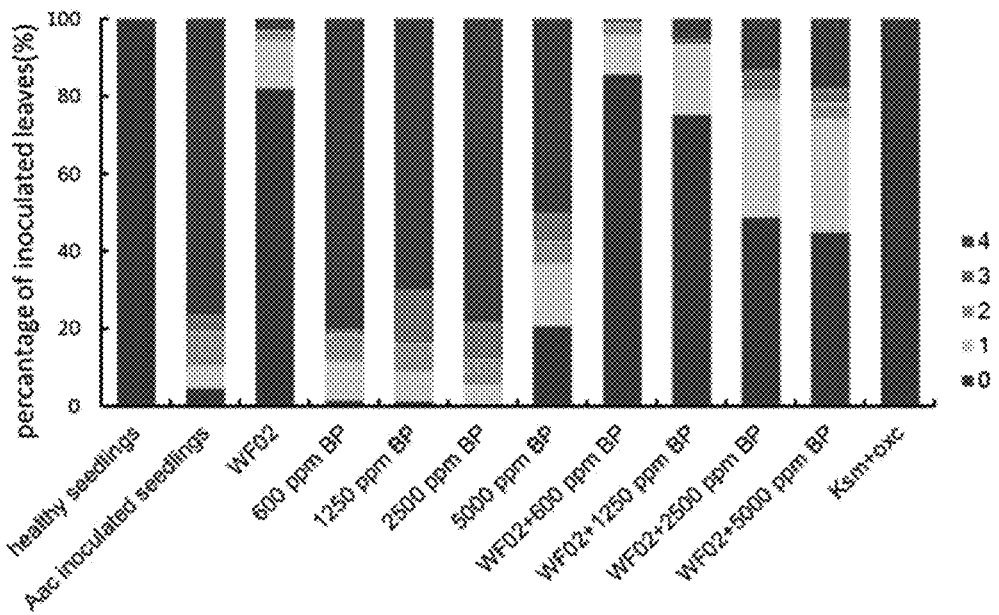
FIG. 8D shows that the biological preparation containing 25,000-200,000 ppm the *Bidens pilosa* extract (BP) improves the efficacy of inhibiting the bacterial fruit blotch of cucurbits in plants in one embodiment of the present invention.
Figure 8E:
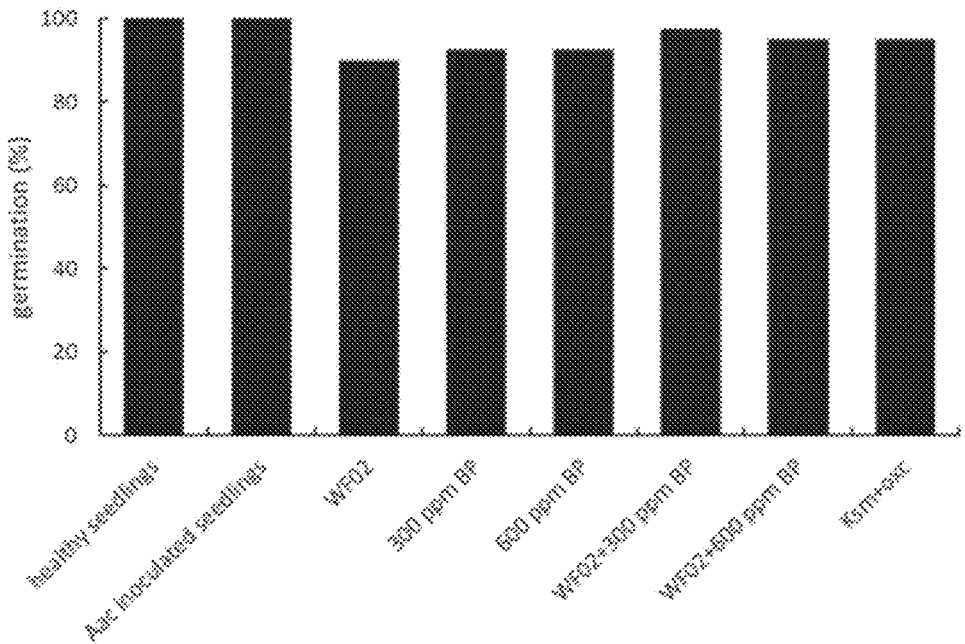
FIG. 8E shows that the biological preparation containing 300 ppm-600 ppm the *Bidens pilosa* extract (BP) affects the germination rate of melon seeds in one embodiment of the present invention.

The results of the effect of the biological preparation of the present invention on the germination rate of melon seeds are shown in FIG. 8A, FIG. 8C, and FIG. 8E. The germination rate of melon seeds was similar (the germination rate was higher than 80%) in the blank control group, the negative control group, the comparison group with the *Bacillus amyloliquefaciens* WF02 of the present invention, the comparison groups with any concentration of the *Bidens pilosa* extract of the present invention, and the test groups with the biological preparation containing any concentration of the *Bidens pilosa* extract of the present invention. The results indicate that the *Bacillus amyloliquefaciens* of the present invention, the *Bidens pilosa* extract of the present invention, and the biological preparation of the present invention would not affect the germination rate of melon seeds, even in the case of containing a relatively high concentration (i.e. more than 25,000 ppm) of the *Bidens pilosa* extract of the present invention.

Figure 8F:
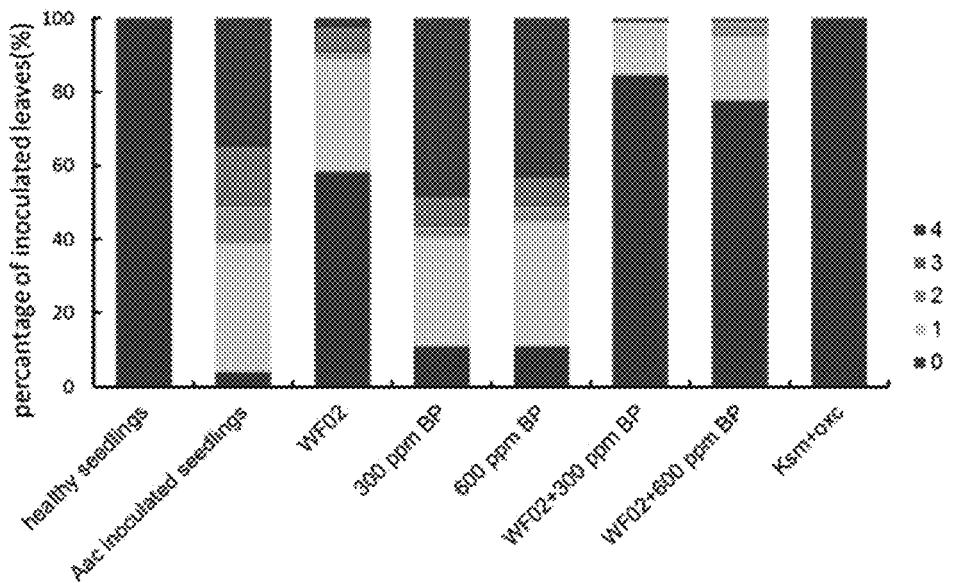
FIG. 8F shows that the biological preparation containing 300 ppm-600 ppm the *Bidens pilosa* extract (BP) improves the efficacy of inhibiting the bacterial fruit blotch of cucurbits in plants in one embodiment of the present invention.

The results of the effect of the biological preparation of the present invention on inhibiting the bacterial fruit blotch of cucurbits in plants are shown in FIG. 8B, FIG. 8D, and FIG. 8F. The symptoms of the bacterial fruit blotch of cucurbits were not found in the healthy blank control group without Aac treatment, and the positive control group with Ksm+oxc; however, the symptoms of the bacterial fruit blotch of cucurbits were found in the negative control group infected with Aac. The results indicate that the method can indeed be used to evaluate the efficacy of the biological preparation of the present invention in inhibiting the bacterial fruit blotch of cucurbits in plants.

Although the high concentration (more than 25,000 ppm) of the *Bidens pilosa* extract of the present invention and the biological preparation containing high concentration (more than 25,000 ppm) of the *Bidens pilosa* extract of the present invention showed the best efficacy in inhibiting the bacterial fruit blotch of cucurbits in plants, in view of the processing cost of preparing the biological preparation, The biological preparation of the present invention containing a relatively low concentration of the *Bidens pilosa* extract of the present invention, and with a good disease control effects is a preferred choice. The biological preparation of the present invention containing 300 ppm or 600 ppm of the *Bidens pilosa* extract of the present invention was found to be more effectively inhibiting the bacterial fruit blotch of cucurbits in plants than the biological preparation containing other concentrations of the *Bidens pilosa* extract of the present invention.

Figure 9:
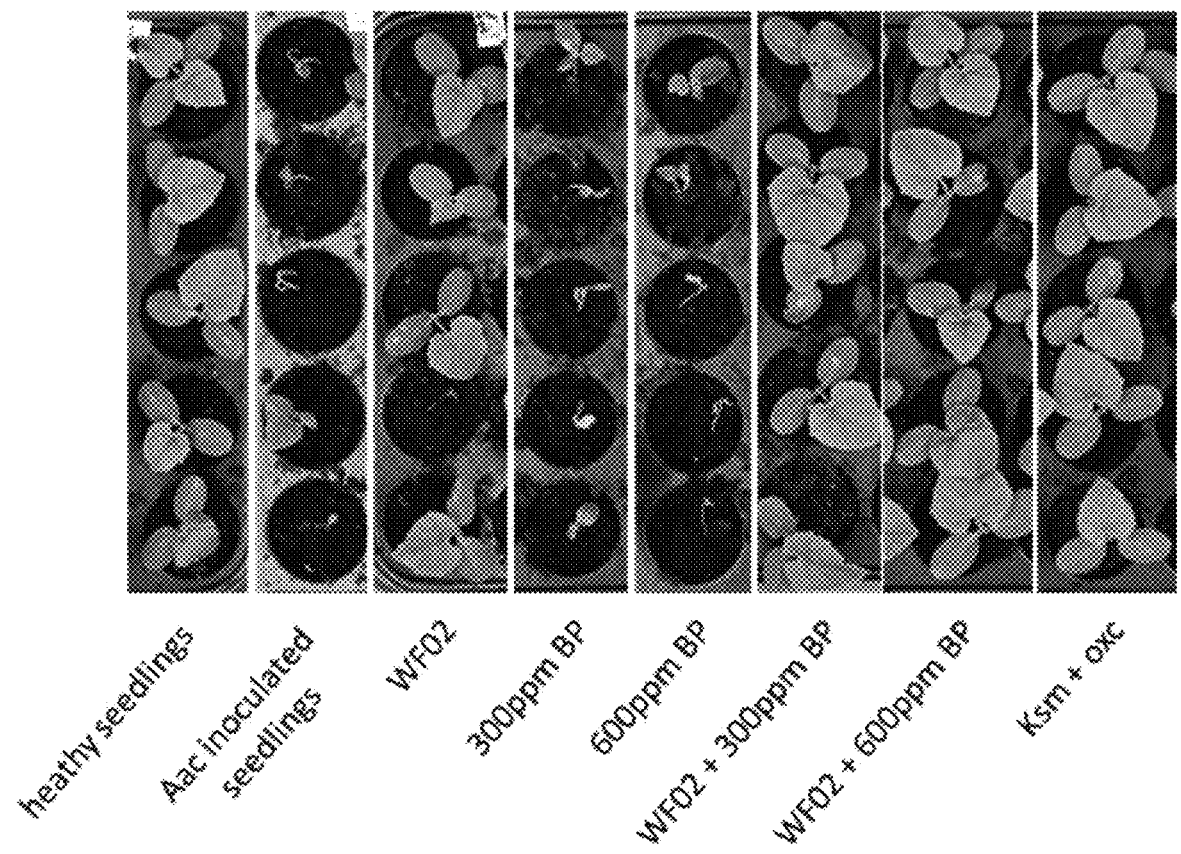
FIG. 9 shows a picture that the biological preparation containing 300 ppm-600 ppm the *Bidens pilosa* extract (BP) improves the efficacy of inhibiting the bacterial fruit blotch of cucurbits in plants in one embodiment of the present invention.

Therefore, the biological preparation of the present invention containing 300 ppm or 600 ppm of *Bidens pilosa* extract of the present invention is a preferable choice; wherein, as showing in FIG. 9, the effects of the biological preparation of the present invention containing 300 ppm and 600 ppm of the *Bidens pilosa* extract of the present invention on controlling the bacterial fruit blotch of cucurbits in plants were similar to the effects of the Ksm+oxc, which is commonly used to inhibit Aac commercially; in addition, the control effects of the biological preparation were also better than groups treated the *Bacillus amyloliquefaciens* WF02 of the present invention alone.

The evaluation results of the effect of the biological preparation of the present invention on biocontrol are shown in Table 2, which contains the three indexes of the disease index, disease incidence, and biological control efficacy. The highest biological control efficiency (close to 99.49%) to inhibit the occurrence of the bacterial fruit blotch of cucurbits in plants, the lowest disease incidence (close to 0.98%), and the lowest disease index (close to 0.36%) were found in the group treated with the Ksm+oxc, which is commonly used to inhibit Aac commercially. Although the biological control efficiency of the biological preparation of the present invention was not as high as that of the chemical pesticide, the *Bacillus amyloliquefaciens* WF02 of the present invention and the biological preparation containing 600 ppm of the *Bidens pilosa* extract of the present invention both shew the biological control efficiency of 69% or more, and compared with the infection group treated only with Aac, the disease incidence could be significantly reduced from 96% to less than 53%, and the disease index could be reduced from 68% to less than 21%; in addition, the biological preparation containing 300 ppm of the *Bidens pilosa* extract of the present invention both shew the biological control efficiency of 75% or more, and the disease incidence could be significantly reduced to less than 42%, and the disease index could be reduced to less than 17%. The results indicate that the biological preparation of the present invention containing 300 ppm or 600 ppm of the *Bidens pilosa* extract of the present invention can effectively enhance the biological control efficiency, reduce the disease incidence, and reduce the disease index, so that the biological preparation of the present invention can indeed effectively inhibit the occurrence of the bacterial fruit blotch of cucurbits in plants.

TABLE 2

The biological control efficiency, the disease incidence, and the disease index of the biological preparation

|  | Aac inoculated | WF02 | 300 ppm BP | 600 ppm BP | 300 ppm BP + WF02 | 600 ppm BP + WF02 | Ksm + oxc |
|---|---|---|---|---|---|---|---|
| Biocontrol/Chemical-control efficacy (%) | — | $69.51^a \pm 17.02$ | $0^a$ | $0^a$ | $75.27^a \pm 24.33$ | $69^a \pm 26.26$ | $99.49^a \pm 0.87$ |
| Disease incidence (%) | $96.26^a \pm 4.39$ | $53.65^b \pm 13.57$ | $96.34^a \pm 1.51$ | $96.31^a \pm 4.10$ | $42.40^{bc} \pm 30.91$ | $53.5^b \pm 19.66$ | $0.98^c \pm 1.69$ |
| Disease index (%) | $68.34^a \pm 6.45$ | $21.03^b \pm 12.92$ | $72.28^a \pm 8.60$ | $73.93^a \pm 12.42$ | $17.62^b \pm 18.04$ | $21.74^b \pm 19.65$ | $0.36^b \pm 0.63$ |

EXAMPLE 9

Effect of the Biological Preparation on Reducing the Amount of Aac in Infected Plants In the embodiment of the present invention, in order to test the effect of the biological preparation on reducing the amount of Aac in infected plants, the cotyledon incubated 10th days of the 10 plants of each group from (1), (2), (3), (4), (5), (13), (14), and (22) in Example 9 were collected and the amount of Aac in them were calculated. First, the cotyledon of the 10 plants of each group were ground and mixed, and suspended in 40 mL phosphate buffered saline (PBS) solution containing 8 g/L sodium chloride (NaCl), 0.2 g/L potassium chloride (KCl), and 1.42 g/L sodium phosphate ($Na_2HPO_4$), and was shaken at 200 rpm for 30 minutes at room temperature to uniformly mix. Next, the supernatant of each mixed solution above was collected and diluted appropriately, and then 100 µL of each supernatant was evenly spread on an AacG semi-selective agarose gel plate with glass beads, and cultured at 37° C. for 2 days; wherein the AacG semi-selective agarose gel (the culture medium added agarose) contained 0.5 g potassium dihydrogen phosphate ($KH_2PO_4$), 2 g disodium hydrogencarbonate hydrate ($Na_2HPO_4.12H_2O$), 2 g ammonium sulfate (($NH_3)_2SO_4$), 5 g L-glutamic acid, 12.5 mg bromothymol blue, 15 g agar, 20 mg penicillin, and 25 ppm cycloheximide. The dilution ratio of supernatant was preferably 30 to 300 colonies on the culture plate. Wherein, L-glutamic acid was the main nutrient source in the medium. When Aac uses amino acids, the alkali compounds, which will convert the culture medium containing bromothymol blue from green to blue, is produced. The number of CFUs/mL per gram of cotyledon weight was calculated using the following formula: Average CFU per milliliters=Average number of colonies for a dilution×100×Dilution factor. Subsequently, the average CFU/per milliliters were divided into total gram of leaves in each treatments.

Figure 10:
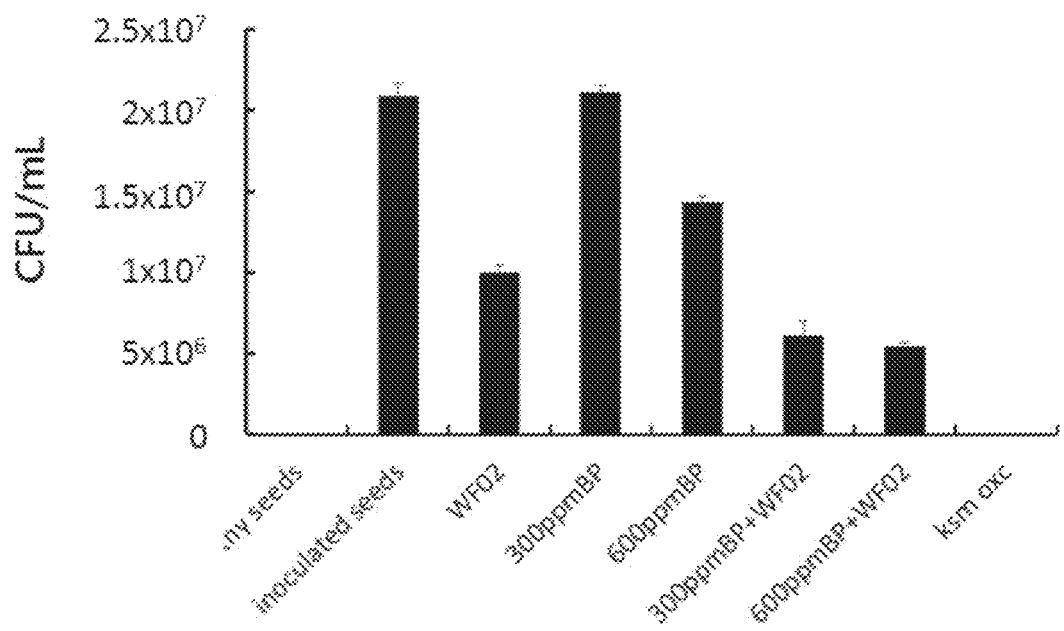
FIG. 10 shows that the biological preparation provides the efficacy of reducing the amount of Aac in plants in one embodiment of the present invention.

The results of the effect of the biological preparation on reducing the amount of Aac in infected plants are shown in FIG. 10. As showing in FIG. 10, the healthy blank control group with LB medium did not contain any Aac, while the negative control group contained about $2 \times 10^7$ CFU/mL Aac, indicating that the method could indeed be used to test the effect of the biological preparation on reducing the amount of Aac in infected plants. After treated with the *Bacillus amyloliquefaciens* WF02 of the present invention, the amount of Aac in the cotyledon of the melon reduced to $10^7$ CFU/mL; and after treated with the biological preparation containing 300 ppm of the *Bidens pilosa* extract of the present invention, the amount of Aac in the cotyledon of the melon reduced to $6 \times 10^6$ CFU/mL; and after treated with the biological preparation containing 600 ppm of the *Bidens pilosa* extract of the present invention, the amount of Aac in the cotyledon of the melon reduced to $5 \times 10^6$ CFU/mL. The results indicate that the *Bacillus amyloliquefaciens* of the present invention can effectively reduce the amount of Aac in infected plants, and the biological preparation containing 300 ppm or 600 ppm of the *Bidens pilosa* extract of the present invention can more effectively reduce the amount of Aac in infected plants, showing that the biological preparation of the present invention can effectively indeed be applied to slow down the occurrence of the bacterial fruit blotch of cucurbits in plants.

In summary, The *Bacillus amyloliquefaciens* of the present invention can effectively inhibit the growth of the *Acidovorax avenae* subsp. *Citrulli* (Aac), and has the potential to slow down the bacterial fruit blotch of cucurbits in plants; however, the effects of inhibiting the growth of Aac is not observed in the supernatant of the culture medium of the *Bacillus amyloliquefaciens* of the present invention, indicating that only the live *Bacillus amyloliquefaciens* has the activity of inhibiting Aac. Therefore, when the *Bacillus amyloliquefaciens* of the present invention is used for preparing a biological preparation, it is necessary to ensure that the microorganism maintains a high viable amount during the production process or storage, so that the biological preparation can maintain the efficacy of inhibiting the pathogenic bacteria after being applied to the field. Wherein, the *Bidens pilosa* extract has a variety of biological activities, and is easy to obtain and plant, therefore the *Bidens pilosa* extract is tested to whether containing the potential of being used as leveling agents for the biological preparation.

After an in vitro test, when the concentration of the *Bidens pilosa* extract of the present invention is between 300-200, 000 ppm, the growth of the *Bacillus amyloliquefaciens* of the present invention is not affected; in addition, the *Bidens pilosa* extract of the present invention is found to effectively improve the effect of the *Bacillus amyloliquefaciens* of the present invention on inhibiting the growth of Aac, and can simultaneously promote the amount of the biofilm synthesis without affecting the normal growth of the *Bacillus amyloliquefaciens* of the present invention, indicating that the *Bidens pilosa* extract of the present invention has the potential of being used as leveling agents for the biological preparation. In addition, the *Bidens pilosa* extract of the present invention can effectively enhance the cell viability of the *Bacillus amyloliquefaciens* of the present invention, and the appropriate dose of the *Bidens pilosa* extract of the present invention can indeed be used as a nutrient source for the growth of the *Bacillus amyloliquefaciens* of the present invention in a nutrient-deficient environment. The results indicate that the *Bidens pilosa* extract of the present invention can be used as leveling agents for the biological preparation and be combined with the *Bacillus amyloliquefaciens* of the present invention to be prepared as the biological preparation capable of inhibiting the growth of Aac, improving the ability of plants to resist diseases, assisting crops in alleviating abiotic stresses, or promoting plant growth.

After the in vivo test in plants, the *Bacillus amyloliquefaciens*, the *Bidens pilosa* extract, or the biological preparation of the present invention would not affect the activity of seed germination, even in the case of a relatively high concentration of the *Bidens pilosa* extract of the present invention (containing more than 25,000 ppm); and the biological preparation of the present invention containing 300 ppm or 600 ppm of the *Bidens pilosa* extract of the present invention has similar efficacy in controlling the bacterial fruit blotch of cucurbits with KASUGAMYCIN+ COPPER OXYCHLORIDE (Ksm+oxc), which is commonly used to inhibit Aac commercially, and its control efficacy is better than that of the group using *Bacillus amyloliquefaciens* of the present invention alone. The biological preparation containing 300 ppm or 600 ppm of the *Bidens pilosa* extract of the present invention can effectively improve the biocontrol efficacy, the disease incidence, and the disease index so that the biological preparation of the present invention can indeed effectively inhibit the bacterial fruit blotch of cucurbits. In addition, the *Bacillus amyloliquefaciens* of the present invention can effectively reduce the amount of Aac in the infected plants, and the biological preparation containing 300 ppm or 600 ppm of the *Bidens pilosa* extract of the present invention can reduce the more amount of Aac in the infected plants, indicating that the biological preparation can indeed be effectively applied to slow down the occurrence of the bacterial fruit blotch of cucurbits in plants.

Therefore, the biological preparation comprising leveling agents of the *Bidens pilosa* extract of the present invention and the *Bacillus amyloliquefaciens* of the present invention indeed has the abilities to inhibit the growth of Aac, improve the ability of plants to resist diseases, assist crops in alleviating abiotic stresses, or promote plant growth; wherein the *Bidens pilosa* extract of the present invention can still increase the metabolic activity of the *Bacillus amyloliquefaciens*, increase the amount of the biofilm formation of the *Bacillus amyloliquefaciens*, and maintains the alive number of the *Bacillus amyloliquefaciens* during the production process or storage. Therefore, the biological preparation of the present invention can maintain the efficacy of inhibiting the pathogenic bacteria after being applied to the field, and the *Bidens pilosa* is an edible food, not a synthetic chemical, so the biological preparation of the present invention can also be applied to the organic farming.

What is claimed is:

1. A composition for inhibiting growth of *Acidovoraxavenae* subsp. *Citrulli*, comprising:
    a *Bacillus amyloliquefaciens* treated with a *Bidens* plant extract;
    wherein the *Bidens* plant extract is added as a nutritional supplement while culturing the *Bacillus amyloliquefaciens* to increase a metabolic activity of the *Bacillus amyloliquefaciens*, increase a biofilm formation of the *Bacillus amyloliquefaciens*, and maintains an alive number of the *Bacillus amyloliquefaciens* during the production process or storage;
    wherein a concentration of the *Bidens* plant extract added while culturing the *Bacillus amyloliquefaciens* is 600 ppm-200,000 ppm;
    wherein the *Bidens* plant extract enhances ability of the *Bacillus amyloliquefaciens* to inhibit growth of *Acidovoraxavenae* subsp. *citrulli*;
    wherein the *Bacillus amyloliquefaciens* is a *Bacillus amyloliquefaciens* strain DSM 33327.

2. The composition according to claim 1, wherein the Bidens plant extract maintains the number of viable bacteria of the *Bacillus amyloliquefaciens* in the composition.

3. The composition according to claim 1, wherein the concentration of the *Bacillus amyloliquefaciens* in the composition is at least $0.8 \times 10^8$ CFU/mL.

4. The composition according to claim 1, wherein the Bidens plant extract is a *Bidens pilosa* extract.

5. The composition according to claim 1, wherein the concentration of the *Bidens* plant extract added during the culturing of *Bacillus amyloliquefaciens* is equal to or more than 600 ppm and less than 2,000 ppm.

6. A method of inhibiting growth of *Acidovoraxavenae* subsp. *Citrulli*, comprising contacting plants with a composition comprising:
    a *Bacillus amyloliquefaciens* treated with a Bidens plant extract to increase a metabolic activity of the *Bacillus amyloliquefaciens*, increase a biofilm formation of the *Bacillus amyloliquefaciens*, and maintain an alive number of the *Bacillus amyloliquefaciens*, wherein the *Bacillus amyloliquefaciens* is treated with the Bidens plant extract whose concentration is 600 ppm-200,000 ppm;
    wherein the *Bidens* plant extract enhances ability of the *Bacillus amyloliquefaciens* to inhibit growth of *Acidovoraxavenae* subsp. *citrulli*;
    wherein the *Bacillus amyloliquefaciens* is a *Bacillus amyloliquefaciens* strain DSM 33327.

7. The method according to claim 6, wherein the *Bidens* plant extract maintains the number of viable bacteria of the *Bacillus amyloliquefaciens* in the composition.

8. The method according to claim 6, wherein the concentration of the *Bacillus amyloliquefaciens* in the composition is at least $0.8 \times 10^8$ CFU/mL.

9. The method according to claim 6, wherein the *Bidens* plant extract is a *Bidens pilosa* extract.

10. The method according to claim 9, wherein the *Bidens pilosa* extract is a *Bidens pilosa* water extract.

11. A method of increasing the ability of a *Bacillus amyloliquefaciens* to inhibit growth of *Acidovoraxavenae* subsp. *Citrulli*, comprising:
    administering an effective amount of a *Bidens* plant extract to the *Bacillus amyloliquefaciens* to increase a metabolic activity of the *Bacillus amyloliquefaciens*, increase a biofilm formation of the *Bacillus amyloliquefaciens*, and maintain an alive number of the *Bacillus amyloliquefaciens*, wherein a concentration of the effective amount of the *Bidens* plant extract administered to the *Bacillus amyloliquefaciens* is 600 ppm-200,000 ppm;
    wherein the Bidens plant extract enhances ability of the *Bacillus amyloliquefaciens* to inhibit growth of *Acidovoraxavenae* subsp. *citrulli*;
    wherein the *Bacillus amyloliquefaciens* is a *Bacillus amyloliquefaciens* strain DSM 33327.

12. The method according to claim 11, wherein the *Bidens* plant extract is a *Bidens* pilosa extract.

13. The method according to claim 12, wherein the *Bidens pilosa* extract is a *Bidens pilosa* water extract.

14. The method according to claim 6, wherein the *Bidens* plant extract is added as a nutritional supplement while culturing the *Bacillus amyloliquefaciens* to increase the metabolic activity of the *Bacillus amyloliquefaciens*, increase the biofilm formation of the *Bacillus amyloliquefaciens*, and maintains the alive number of the *Bacillus amyloliquefaciens* during a production process or storage.

15. The method according to claim 6, wherein the *Bacillus amyloliquefaciens* is treated with the *Bidens* plant extract whose concentration is equal to or more than 600 ppm and less than 2,000 ppm.

16. The method according to claim 11, wherein the concentration of the effective amount of the *Bidens* plant extract administered to the *Bacillus amyloliquefaciens* is equal to or more than 600 ppm and less than 2,000 ppm.

* * * * *